United States Patent
Hayakawa et al.

(10) Patent No.: US 7,280,996 B2
(45) Date of Patent: Oct. 9, 2007

(54) DATA UPDATING METHOD AND RELATED INFORMATION PROCESSING DEVICE

(75) Inventors: Motomu Hayakawa, Shiojiri (JP); Isao Nebashi, Tatsuno-Machi (JP); Masaru Kai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 360 days.

(21) Appl. No.: 10/344,121

(22) PCT Filed: Aug. 9, 2001

(86) PCT No.: PCT/JP01/06877

§ 371 (c)(1),
(2), (4) Date: Feb. 7, 2003

(87) PCT Pub. No.: WO02/13062

PCT Pub. Date: Feb. 14, 2002

(65) Prior Publication Data

US 2003/0154187 A1   Aug. 14, 2003

(30) Foreign Application Priority Data

Aug. 9, 2000  (JP)  ............................. 2000-241687

(51) Int. Cl.
 *G06F 17/30* (2006.01)
(52) U.S. Cl. ..................... 707/1; 707/202; 707/204
(58) Field of Classification Search ............. 707/1–10, 707/200–204
See application file for complete search history.

(56) References Cited

U.S. PATENT DOCUMENTS

| 5,832,510 | A | * | 11/1998 | Ito et al. ...................... 707/201 |
| 5,884,323 | A | * | 3/1999 | Hawkins et al. ............ 707/201 |
| 5,884,325 | A |   | 3/1999 | Bauer et al. ................. 707/201 |
| 5,924,096 | A |   | 7/1999 | Draper et al. ................. 707/10 |
| 6,330,618 | B1 | * | 12/2001 | Hawkins et al. ............ 709/248 |
| 6,370,566 | B2 | * | 4/2002 | Discolo et al. ............. 709/206 |
| 6,671,700 | B1 | * | 12/2003 | Creemer et al. ............ 707/201 |
| 6,810,405 | B1 | * | 10/2004 | LaRue et al. ............... 707/201 |
| 6,868,451 | B1 | * | 3/2005 | Peacock ..................... 709/231 |

FOREIGN PATENT DOCUMENTS

| JP | 9-6693 | 1/1997 |
| JP | 09-006693 A | 1/1997 |
| JP | 11-327987 | 11/1999 |
| JP | 11-327989 | 11/1999 |
| JP | 2000-40025 | 2/2000 |
| WO | WO 98/21648 | 5/1998 |
| WO | WO 00/29998 | 5/2000 |

* cited by examiner

*Primary Examiner*—Don Wong
*Assistant Examiner*—Hanh Thai
(74) *Attorney, Agent, or Firm*—Mark P. Watson

(57) ABSTRACT

In a case where application data stored in a PC database 300a are edited by a PC 300, and the edited contents are to be reflected to contents of the memory of a terminal database 200a, PC 300 refers to a synchronization profile SP including item IDs and ID numbers of a most recent synchronization communication and communication time information of the synchronization communication, thereby detecting which items have been edited at a time subsequent to completion of a most recent synchronization communication.

5 Claims, 22 Drawing Sheets

FIG. 3

Table 200a:

| ID NUMBER | ITEM | EDIT FLAG | REGULAR EVENT FLAG | MISSING FLAG |
|---|---|---|---|---|
| 1 | AAA | NONE | FALSE | FALSE |
| 2 | BBB | NONE | FALSE | FALSE |
| 3 | CCC | NONE | FALSE | FALSE |
| 4 | DDD | NONE | FALSE | FALSE |
| 5 | EEE | NONE | FALSE | FALSE |
| 6 | FFF | NONE | FALSE | FALSE |

Table 300a:

| ITEM | ITEM ID | EDIT TIME |
|---|---|---|
| AAA | 123······ | 2000 7/10 15:05 |
| BBB | 234······ | ················ |
| CCC | 345······ | ················ |
| DDD | 456······ | ················ |
| EEE | 567······ | ················ |
| FFF | 678······ | ················ |

Table SP:

| ID NUMBER | ITEM ID |
|---|---|
| 1 | 123······ ··· |
| 2 | 234······ ··· |
| 3 | 345······ ··· |
| 4 | 456······ ··· |
| 5 | 567······ ··· |
| 6 | 678······ ··· |

PIM INFORMATION
USER INFORMATION
COMMUNICATION TIME 2000 7/12 10:05

FIG. 5

Table 200a:

| ID NUMBER | ITEM | EDIT FLAG | REGULAR EVENT FLAG | MISSING FLAG |
|---|---|---|---|---|
| 1 | AAA | NONE | FALSE | FALSE |
| 2 | BBB | NONE | FALSE | FALSE |
| 3 | CCC | NONE | FALSE | FALSE |
| 5 | EEE | NONE | FALSE | FALSE |
| 6 | FFF | NONE | FALSE | FALSE |
| 7 | HHH | NONE | FALSE | FALSE |

Table 300a:

| ITEM | ITEM ID | EDIT TIME |
|---|---|---|
| AAA | 123······ | ······ |
| BBB | 234······ | ······ |
| CCC | 345······ | ······ |
| EEE | 567······ | ······ |
| FFF | 678······ | 2000 7/14 11:05 |
| HHH | 789······ | 2000 7/14 12:00 |

Table SP:

| ID NUMBER | ITEM ID |
|---|---|
| 1 | 123······ |
| 2 | 234······ |
| 3 | 345······ |
| 5 | 567······ |
| 6 | 678······ |
| 7 | 789······ |

PIM INFORMATION ······
USER INFORMATION ······
COMMUNICATION TIME 2000 7/16 11:00

| ID NUMBER | ITEM | EDIT FLAG | REGULAR EVENT FLAG | MISSING FLAG |
|---|---|---|---|---|
| 1 | AAA' | NONE | FALSE | FALSE |
| 2 | BBB | NONE | FALSE | FALSE |
| 4 | DDD | NONE | FALSE | FALSE |
| 5 | EEE | NONE | FALSE | FALSE |
| 6 | FFF | NONE | FALSE | FALSE |
| 8 | GGG | NONE | FALSE | FALSE |

300a

| ITEM | ITEM ID | EDIT TIME |
|---|---|---|
| AAA' | 123······ | ······ |
| BBB | 234······ | ······ |
| DDD | 456······ | ······ |
| EEE | 567······ | ······ |
| FFF | 678······ | ······ |
| GGG | 890······ | ······ |

SP

| ID NUMBER | ITEM ID |
|---|---|
| 1 | 123······ |
| 2 | 234······ |
| 4 | 456······ |
| 5 | 567······ |
| 6 | 678······ |
| 8 | 890······ |

PIM INFORMATION  ······
USER INFORMATION  ······
COMMUNICATION TIME 2000 7/16 11:00

DATA UPDATING METHOD AND RELATED INFORMATION PROCESSING DEVICE

TECHNICAL FIELD

This invention relates to a data updating method for use in synchronizing application data stored in databases of a plurality of information processing devices, the data being generated by a schedule management, or an address management, or a similar application, and to an information processing device for implementing the method.

BACKGROUND ART

Various types of schedule managers, address managers, and similar applications are now used in personal computers (PCs). Using a schedule management application, data can be added, changed, or deleted, to be saved in a database in a storage device, such as a hard disk drive of a PC, for display by a user in managing schedules.

Schedule data or address data stored in a database of a PC can be duplicated for use in a handheld information device such as a Personal Digital Assistant (PDA), so that identical information to that in the PC can also be used in the handheld information device.

In the case that data is duplicated between such devices, however, if data in one device is modified, corresponding data in a corresponding device must be updated. This process is referred to as a synchronization process where data stored in databases of subject information devices are updated via data communication.

In carrying out data synchronization, in each of the devices, an existing schedule data state in a database is compared with past schedule data state as of completion of a last previous synchronization operation. If a change in data in one device is detected, a corresponding data change is made in a corresponding device. In this way, respective databases of the information devices can be updated as required.

However, the conventional art used for effecting a data update operation between corresponding devices suffers from the drawbacks as follow:

If synchronization of a large amount of data is to be performed between corresponding devices, a complicated data processing operation must be used.

Further, if data synchronization is to be carried out between devices employed in an organization such as a company, data are stored in a database server or similar device of a Local Area Network (LAN). In a LAN, a plurality of networked PCs share data stored, typically, in a server database. In the case that a user of, for example, a PDA, wishes to synchronize, for example, schedule data between the PDA and one of a plurality of PCs connected to a LAN, a limitation exists that the operation can be performed between the PDA and only a specified PC connected to the LAN. To date, no technology has existed which will allow a user of, for example, a PDA to perform data synchronization with any of a plurality of PCs connected to a LAN.

The present invention has been made with a view to overcoming this problem of the prior art, and has as its object the provision of a data updating method by which it is possible to avoid, in the case that a large amount of data for synchronization exists, the need to conduct complicated data processing in carrying out an update operation. In addition, the method of the present invention makes it possible to perform a data updating operation between an external information processing device and any of a plurality of network-connected information processing devices. The present invention also provides an information processing device for implementing the method.

DISCLOSURE OF THE INVENTION

In order to solve the above problem, the present invention provides a data updating method comprising: use of a first information processing device containing a first database; a second information processing device containing a second database; each of said first and second database storing application data consisting of one or a plurality of data units generated by a given application; a memory contained in either one of said first or second information processing device storing an update file including communication time information indicating a date and time of a synchronization communication initiated by said first information processing device, by which said second information processing device is notified of data updated in said first database to be updated in said second database for synchronization with said updated data in said first database, said update file also including identification numbers assigned to each of data units which comprise application data in said first database; said first information processing device, if required, adding a new data unit, changing or deleting a data unit of said application data, and when a new data unit is added to the application data in said first database or when the contents of one of said one or a plurality of data units are changed, storing edit time data indicating a date and time of an addition or change of a data unit, the edit time corresponding to an identification number of an added or changed data unit; said first information processing device, upon initiation of a synchronization communication with said second information processing device for notifying data updated in said first database to be updated in said second database for synchronization with said updated data in said first database, comparing said identification numbers of said data units and said communication time of the synchronization communication, said identification numbers and communication time being stored in said update file, with the identification numbers of data units and edit time data of each of said data units stored in said first database, to thereby detect among said plurality of data units which comprise said application data stored in said first database, any data units that have been added, changed, or deleted at a time subsequent to completion of a most recent synchronization communication; said first information processing device, in a case where a newly added or changed data unit is detected, transmitting to said second information processing device the data unit with its identification number, and an instruction to add or change the data unit and storing the identification number in said update file; said first information processing device, in a case where deletion of a data unit is detected, transmitting to said second information processing device the identification number of the deleted data unit with an instruction to delete a data unit corresponding to the identification number and deleting the identification number from said update file; and said second information processing device updating the application data in said second database on the basis of information transmitted from said first information processing device. This method will be hereinafter referred to as a first data updating method.

The present invention further provides a data updating method (hereinafter referred to as a second data updating method) comprising: use of a first information processing device containing a first database; a second information processing device containing a second database; each of said first and second database storing application data consisting of one or a plurality of data units generated by a given application; a memory contained in one of either said first or second information processing device storing an update file including communication time information indicating a date and time of a synchronization communication initiated by one of either said first or said second information processing device, by which the other of said first or said second information processing device is notified of data updated in a database of said one device to be updated in a database of said other device for synchronization with said updated data in said database of said one device, said update file also including identification numbers assigned to each of data units which comprise synchronized application data in a database of said one or said other device; said first information processing device, if required, adding a new data unit, changing or deleting a data unit of said application data, and when a new data unit is added to the application data in said first database or when the contents of one of said one or a plurality of data units are changed, storing edit time data indicating a date and time of an addition or change of a data unit, the edit time corresponding to an identification number of an added or changed data unit; said second information processing device, when application data stored in said second database is edited to add a new data unit, change or delete one of said one or plurality of data units, recording edit information as to which editing operation has been performed, which edit information corresponds to an identification number of edited data unit in said second database; said first information processing device, when a synchronization communication is performed by one of either said first or said second information processing device notifying data updated in a database of said one device to be updated in a database of the other of said first or said second information processing device for synchronization with said updated data in said database of said one device, comparing said identification numbers of said data units and said communication time of the synchronization communication, said identification numbers and communication time being stored in said update file, with the identification numbers of data units and edit time data of each of said data units stored in said first database, to thereby detect among said plurality of data units which comprise said application data stored in said first database, any data units that have been added, changed, or deleted at a time subsequent to completion of a most recent synchronization communication; said first information processing device, in a case where a newly added or changed data unit is detected, transmitting to said second information processing device the data unit with its identification number, and an instruction to add or change the data unit; said first information processing device, in a case where deletion of a data unit is detected, transmitting to said second information processing device the identification number of the deleted data unit with an instruction to delete a data unit corresponding to the identification number; said second information processing device updating application data in said second database on the basis of the data transmitted from said first information processing device; said second information processing device, in a case where said edit information indicates that a new data unit has been added, transmitting to said first information processing device the additional data unit and the identification number of the additional data unit, with data instructing an addition of the data unit; and said second information processing device, in a case where said edit information indicates that one of said one or plurality of data units has been changed, transmitting the changed data unit and the identification number of the changed data unit, with data instructing a change of the changed data unit, to said first information processing device; said second information processing device, in a case where said edit information indicates that one of said one or plurality of data units has been deleted, transmitting the identification number of the deleted data unit, with data instructing a deletion of a data unit corresponding to the identification number, to said first information processing device; said first information processing device updating application data in said first database on the basis of the data transmitted from said second information processing device; and said first information processing device, after the updating of the application data in said first database is completed, updating said identification numbers and said communication time information stored in said update file on the basis of application data stored in its own database and a date and time of this synchronization communication.

In the above first or second data updating method, said second information processing device may be a handheld information processing device.

In a preferred embodiment of the above second data updating method, said first information processing device, when a data unit created at said second database at a time subsequent to completion of a most recent synchronization communication is transmitted to said first information processing device to be written into said first database, may assign a new identification number to the data unit to be written in and transmit said assigned new identification number to the second information processing device; and said second information processing device may store said assigned new identification number in said second database, relating said new identification number to the data unit created at the time subsequent to completion of the most recent synchronization communication.

The present invention further provides a third data updating method comprising: use of a first information processing device containing a first database; a second information processing device containing a second database; each of said first and second database storing application data consisting of one or plurality of data units generated by a given application; said first information processing unit, when application data stored in said first database is edited to add a new data unit, change or delete one of said one or plurality of data units, recording edit information as to which editing operation has been performed, which edit information corresponds to an identification number of edited data unit in said first database; said first information processing device, upon initiation of a synchronization communication with said second information processing device for notifying data updated in said first database to be updated in said second database for synchronization with said updated data in said first database, in a case where said edit information indicates that a new data unit has been added, transmitting to said second information processing device the additional data unit and the identification number of the additional data unit, with data instructing an addition of the data unit; and said first information processing device, in a case where said edit information indicates that one of said one or plurality of data units has been changed, transmitting the changed data unit and the identification number of the changed data unit, with data instructing a change of the changed data unit, to said second information processing device; said first information processing device, in a case where said edit information indicates that one of said one or plurality of data units has been deleted, transmitting the identification number of the deleted data unit, with data instructing a deletion of a data unit corresponding to the identification number to said second information processing device, and said second information processing device updating application data in said second database on the basis of the data transmitted from said first information processing device.

In the third data updating method, said first information processing device may be a handheld information processing device.

In a preferred embodiment of the above first, second, or third data updating method, in the case that application data relates to a date and time, said first or second information processing device may detect not only data units that have been added or changed at a time subsequent to completion of a most recent synchronization communication but also data units that have been deleted at a time subsequent to completion of the most recent synchronization communication, from among data units existing in said first database at the beginning of this synchronization communication and having dates falling within a prescribed time period.

In another preferred embodiment of the above first, second, or third data updating method, data units may include one or more subordinate secondary data units, and in the case that a data unit stored in each of said first and second databases includes secondary data units which differ in number between the said data units stored in each of said first and second databases, and when in one of said databases a one of said data units which includes a larger number of secondary data units is updated on the basis of the other of the said data units including a smaller number of secondary data units, and which said other of the data units is stored in the other of said databases, said first or said second information processing device may prevent any secondary data unit of the data unit including a larger number of secondary data units, said any secondary data unit not being included in said other data unit including a smaller number of secondary data units, from being deleted.

In another preferred embodiment of the above first, second, or third data updating method, data units may include one or more subordinate secondary data units, and in the case that a maximum data size of a subordinate secondary data unit differs between said data units stored in each of said first or said second database, and when data size of a said secondary data unit stored in a data unit of a one of said databases with a larger maximum data size is larger than the maximum data size of a said secondary data unit allowed in a data unit of the other of said databases with a smaller maximum data size, said first or second information processing device may prevent said secondary data unit of a larger data size stored in said one database of a larger maximum data size from being deleted in updating said one database on the basis of the memory of said other database.

Preferably, in the above first, second, or third data updating method, in the case that a synchronization communication is initiated, user information stored in each of said first and second information processing device may be compared; and when said user information is determined to be the same, updating the memory of second database may be performed.

The present invention further provides a fourth data updating method comprising: use of an information processing device being one of a network-connected plurality of information processing devices sharing a database storing application data containing one or plurality of data units; a handheld information processing device containing a database for storing application data containing one or plurality of data units; said handheld information processing device storing an update file including communication time information indicating a date and time of a synchronization communication initiated by one of either said information processing device or said handheld information processing device, by which the other of said information processing device or said handheld information processing device is notified of data updated in a database of said one device to be updated in a database of said other device for synchronization with said updated data in said database of said one device, said update file also including identification numbers assigned to data units which comprise synchronized application data in a database of said one or said other device; said information processing device, if required, adding a new data unit, changing or deleting a data unit of said application data; and when a new data unit is added to the application data in its own database or when the contents of one of said one or a plurality of data units are changed, storing edit time data indicating a date and time of an addition or change of a data unit, the edit time corresponding to an identification number of an added or changed data unit; said handheld information processing device, when application data stored in its own database is edited to add a new data unit, change or delete one of said one or plurality of data units, recording edit information as to which editing operation has been performed, which edit information corresponds to an identification number of edited data unit in the database; said information processing device, when a synchronization communication is performed by one of either said information processing device or said handheld information processing device notifying data updated in said database of said one device to be updated in said database of said other device for synchronization with said updated data in the database of said one device, comparing said identification numbers of said data units and said communication time of the synchronization communication, said identification numbers and communication time being stored in said update file, with the identification numbers of data units and edit time data of each of said data units stored in the database of said information processing device, to thereby detect among said plurality of data units which comprise said application data stored in said database of said information processing device, any data units that have been added, changed, or deleted at a time subsequent to completion of a most recent synchronization communication; said information processing device, in a case where a newly added or changed data unit is detected, transmitting to said handheld information processing device the data unit with its identification number, and either add edit or change edit information to prompt addition or change of the data unit; said information processing device, in a case where deletion of a data unit is detected, transmitting to said handheld information processing device the identification number of the deleted data unit with an instruction to delete a data unit corresponding to the identification number; said handheld information processing device updating application data in its own database on the basis of data transmitted from said information processing device; said handheld information processing device, in a case where said edit information indicates that a new data unit has been added, transmitting to said information processing device the additional data unit and the identification number of the additional data unit, with edit add information for the data unit; and said handheld information processing device, in a case where said edit information indicates that one of said one or plurality of data units has been changed, transmitting the changed data unit and the identification number of the changed data unit, with edit change information for the changed data unit, to said information processing device; said handheld information processing device, in a case where said edit information indicates that one of said one or plurality of data units has been deleted, transmitting the identification number of the deleted data unit, with edit delete information for the data unit to said information processing device; said information processing device updating application data in its own database on the basis of data transmitted from said handheld information processing device; and said handheld information processing device updating said identification numbers and said communication time information stored in said update file on the basis of application data stored in its own database and a date and time of this synchronization communication.

In a preferred embodiment of the above fourth data updating method, said information processing device may transmit its stored updated said update file to said handheld information processing device; and said handheld information processing device may store in its memory the transmitted updated said update file in a memory contained in itself.

In another preferred embodiment of the above fourth data updating method, upon initiation of a synchronization communication between said information processing device and said handheld information processing device, user information prestored in said update file contained in each of the devices may be compared; and in the case where the user information stored in one device is determined to be the same as the user information stored in the other device, updating each of the databases may be performed so as to synchronize the memory of the database of said one device and the memory of the database of said other device.

Preferably, the above first, second, or fourth data updating method is characterized in that detection of data units further comprises: when a data unit which is stored in first database or the database of said information processing device has no corresponding identification number stored in said update file, determining that the data unit was created at a time subsequent to completion of a most recent synchronization communication; and when a data unit exists, in said first database or the database of said information processing device, which has an identification number stored in said update file, but the edit time data of which indicates a time later than that of communication time data contained in said update file, determining that the data unit was changed at a time subsequent to completion of a most recent synchronization communication; and further when a data unit exists which is not stored in said first database or in the database of said information processing device, but which has an identification number stored in said update file, determining that the subject data unit was deleted at a time subsequent to completion of a most recent synchronization communication.

Preferably, the above first, second, third, or fourth data updating method is characterized in that the step of updating application data, performed by one of either said first or said second information processing device, or either said information processing device or said handheld information processing device, in its own database on the basis of information transmitted from a device at the other end further comprises: in the case that edit add information is transmitted, adding said transmitted data unit and its identification number in its said own database; in the case that edit change information is transmitted, overwriting the transmitted data unit onto a data unit, in its said own database, identified by the transmitted identification number of the data unit; and in the case that edit delete information is transmitted, deleting a data unit that is stored in its said own database and is identified by the transmitted identification number.

Preferably, the above first, second, third, or fourth data updating method may further comprise, in the case that said first information processing device or said information processing device stores in its own database application data edited by a plurality of applications, a step of converting data in a plurality of different formats edited by said plurality of applications into one data format.

The present invention further provides an information processing device comprising means for implementing one of the above data updating methods in various embodiments.

The present invention provides, for example, an information processing device comprising: a first database storing application data consisting of one or a plurality of data units generated by a given application; a memory storing an update file including communication time information indicating a date and time of a synchronization communication initiated by the information processing device, by which a second information processing device is notified of data updated in said first database to be updated in a second database of said second information processing device for synchronization with said updated data in said first database, said update file also including identification numbers assigned to each of data units which comprise application data in said first database; means for, if required, adding a new data unit, changing or deleting a data unit of said application data; and storing means, at the time of adding a new data unit to the application data in said first database or changing contents of a data unit in said first database, for storing edit time data indicating a date and time of an addition or change of a data unit, the edit time corresponding to an identification number of an added or changed data unit, the device further comprising: as means for performing a synchronization communication with said second information processing device for notifying data updated in said first database to be updated in said second database for synchronization with said updated data in said first database, detecting means for comparing said identification numbers of said data units and said communication time of the synchronization communication, said identification numbers and communication time being stored in said update file, with the identification numbers of data units and edit time data of each of said data units stored in said first database, to thereby detect among said plurality of data units which comprise said application data stored in said first database, any data units that have been added, changed, or deleted at a time subsequent to completion of a most recent synchronization communication; transmitting and storing means, in a case where a newly added or changed data unit is detected, for transmitting to said second information processing device the data unit with its identification number, and either edit add or edit change information for the data unit, and storing the identification number in said update file; and transmitting and deleting means, in a case where deletion of a data unit is detected, for transmitting to said second information processing device the identification number of the deleted data unit with edit delete information for a data unit corresponding to the identification number, and deleting the identification number from said update file.

Preferably, the above information processing device may further comprise means, in the case where said update file is stored in said second information processing device, for implementing a synchronization communication by referring to said update file stored in said second information processing device.

Preferably, in the case that the above information processing device is capable of storing application data edited by said given application of a plurality of kinds in said first database, the device may further comprise interface means which converts a plurality of data sets in different data formats for each of said plurality of kinds of applications, each set of data being edited by a corresponding application, into one data format that can be treated in said synchronization communication.

The present invention further provides, for example, an information processing device, comprising: a first database storing application data consisting of one or a plurality of data units generated by a given application; and recording means, when application data stored in said first database is edited to add a new data unit, change or delete one of said one or plurality of data units, for recording edit information as to which editing operation has been performed, which edit information corresponds to an identification number of edited data unit in said first database, the device further comprising: as means for performing a synchronization communication with a second information processing device for notifying data updated in said first database to be updated in a second database of said second information processing device for synchronization with said updated data in said first database, transmitting means, in a case where said edit information indicates that a new data unit has been added, for transmitting to said second information processing device the additional data unit and the identification number of the additional data unit, with edit add information for the data unit; transmitting means, in a case where said edit information indicates that one of said one or plurality of data units has been changed, for transmitting the changed data unit and the identification number of the changed data unit, with edit change information for the changed data unit, to said second information processing device; and transmitting means, in a case where said edit information indicates that one of said one or plurality of data units has been deleted, for transmitting the identification number of the deleted data unit, with edit delete information for the data unit to said second information processing device.

Furthermore, the present invention may be implemented not only in an embodiment such as of producing and selling a device which performs data updating but also in an embodiment of distributing to users through a telecommunication line a program for making a network-connected computer function as a data updating device; and in an embodiment of distributing such a program recorded in a computer-readable recording medium.

For example, the present invention provides a computer program product for causing a first information processing device to execute: a process of storing application data consisting of one or a plurality of data units generated by a given application in a first database of the first information processing device; a process of storing in a memory an update file including communication time information indicating a date and time of a synchronization communication initiated by said first information processing device, by which a second information processing device is notified of data updated in said first database to be updated in a second database of said second information processing device for synchronization with said updated data in said first database, said update file also including identification numbers assigned to each of data units which comprise application data in said first database; a process of, if required, adding a new data unit, changing or deleting a data unit of said application data; and a process of storing, at the time of adding a new data unit to the application data in said first database or changing contents of a data unit in said first database, edit time data indicating a date and time of an addition or change of a data unit, the edit time corresponding to an identification number of an added or changed data unit, the computer program product for causing the first information processing device to further execute: as process of a synchronization communication with said second information processing device for notifying data updated in said first database to be updated in said second database for synchronization with said updated data in said first database, a process of comparing said identification numbers of said data units and said communication time of the synchronization communication, said identification numbers and communication time being stored in said update file, with the identification numbers of data units and edit time data of each of said data units stored in said first database, to thereby detect among said plurality of data units which comprise said application data stored in said first database, any data units that have been added, changed, or deleted at a time subsequent to completion of a most recent synchronization communication; a process, in a case where a newly added or changed data unit is detected, of transmitting to said second information processing device the data unit with its identification number, and edit add or edit change information for the data unit, and storing the identification number in said update file; and a process, in a case where deletion of a data unit is detected, of transmitting to said second information processing device the identification number of the deleted data unit with edit delete information for a data unit corresponding to the identification number, and deleting the identification number from said update file.

The present invention further provides, for example, a computer readable program recording medium which stores a program for causing a first information processing device to execute: a process of storing application data consisting of one or a plurality of data units generated by a given application in a first database of a first information processing device; a process of storing in a memory an update file including communication time information indicating a date and time of a synchronization communication initiated by said first information processing device, by which a second information processing device is notified of data updated in said first database to be updated in a second database of said second information processing device for synchronization with said updated data in said first database, said update file also including identification numbers assigned to each of data units which comprise application data in said first database; a process of, if required, adding a new data unit, changing or deleting a data unit of said application data; and a process of storing, at the time of adding a new data unit to the application data in said first database or changing contents of a data unit in said first database, edit time data indicating a date and time of an addition or change of a data unit, the edit time corresponding to an identification number of an added or changed data unit, wherein the program for causing the first information processing device further executes: as process of a synchronization communication with said second information processing device for notifying data updated in said first database to be updated in said second database for synchronization with said updated data in said first database, a process of comparing said identification numbers of said data units and said communication time of the synchronization communication, said identification numbers and communication time being stored in said update file, with the identification numbers of data units and edit time data of each of said data units stored in said first database, to thereby detect among said plurality of data units which comprise said application data stored in said first database, any data units that have been added, changed, or deleted at a time subsequent to completion of a most recent synchronization communication; a process, in a case where a newly added or changed data unit is detected, of transmitting to said second information processing device the data unit with its identification number, and edit add or edit change information for the data unit, and storing the identification number in said update file; and a process, in a case where deletion of a data unit is detected, of transmitting to said second information processing device the identification number of the deleted data unit with edit delete information for a data unit corresponding to the identification number, and deleting the identification number from said update file.

Methods and devices provided in the present invention make it possible to avoid, in the case that a large amount of data exists in a database, the need to conduct complicated data processing in carrying out an update operation. In addition, in the present invention it is possible to perform a data updating operation between an external information processing device and any of a plurality of network-connected information processing devices.

BRIEF DESCRIPTION OF THE DRAWINGS

FIG. 3 is a diagram illustrating the principles underlying this data updating method.

FIG. 5 is a diagram illustrating the principles underlying this data updating method.

FIG. 7 is a diagram illustrating the principles underlying this data updating method.

BEST MODE OF CARRYING OUT THE INVENTION

Embodiments of the present invention will now be described in detail with reference to the accompanying drawings.

A. FIRST EMBODIMENT

A-1. System Configuration

Figure 1:
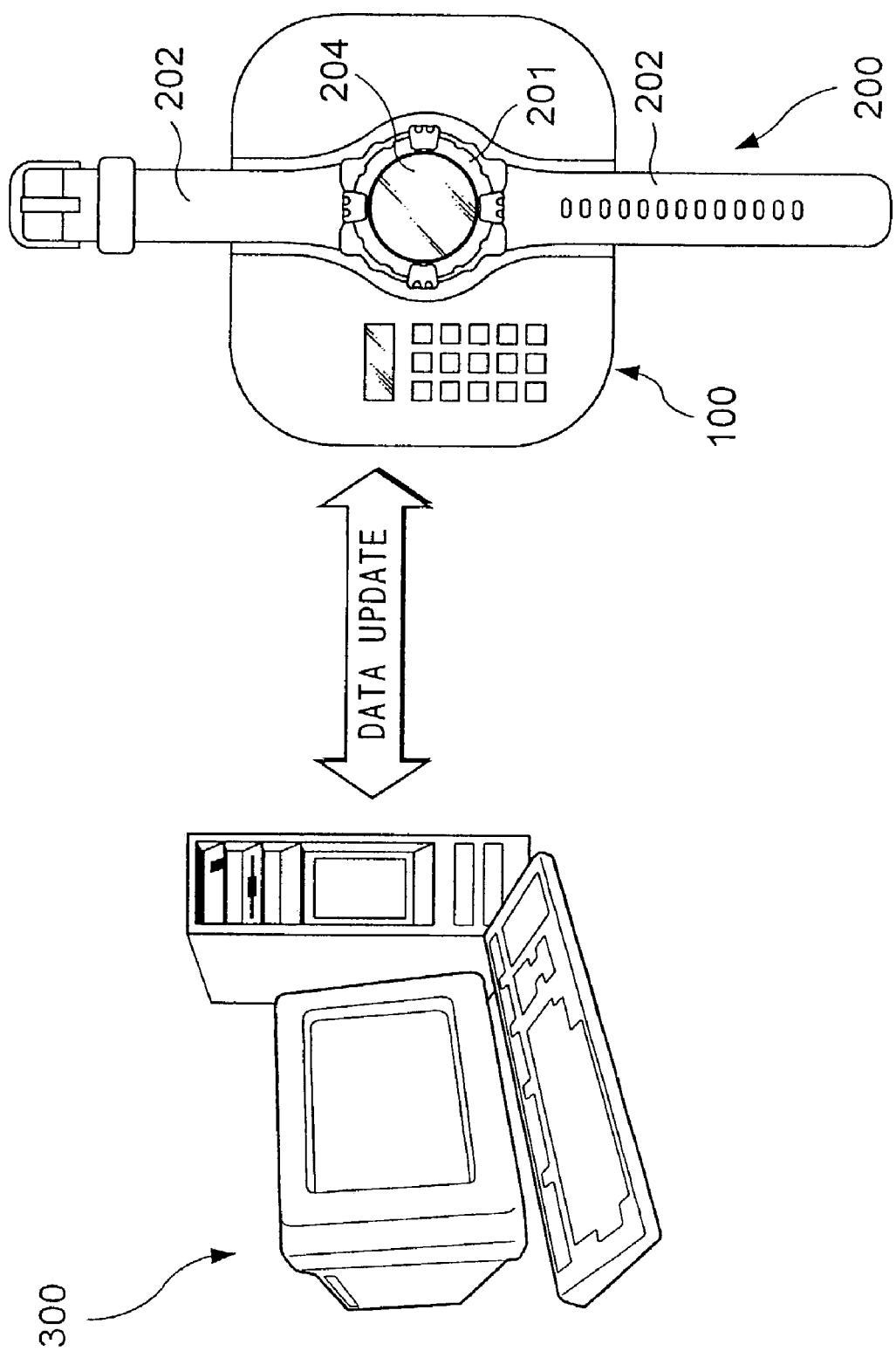
FIG. 1 is a diagram showing a schematic configuration of a system to which a data updating method of the first embodiment of the invention is applied.
Figure 2:
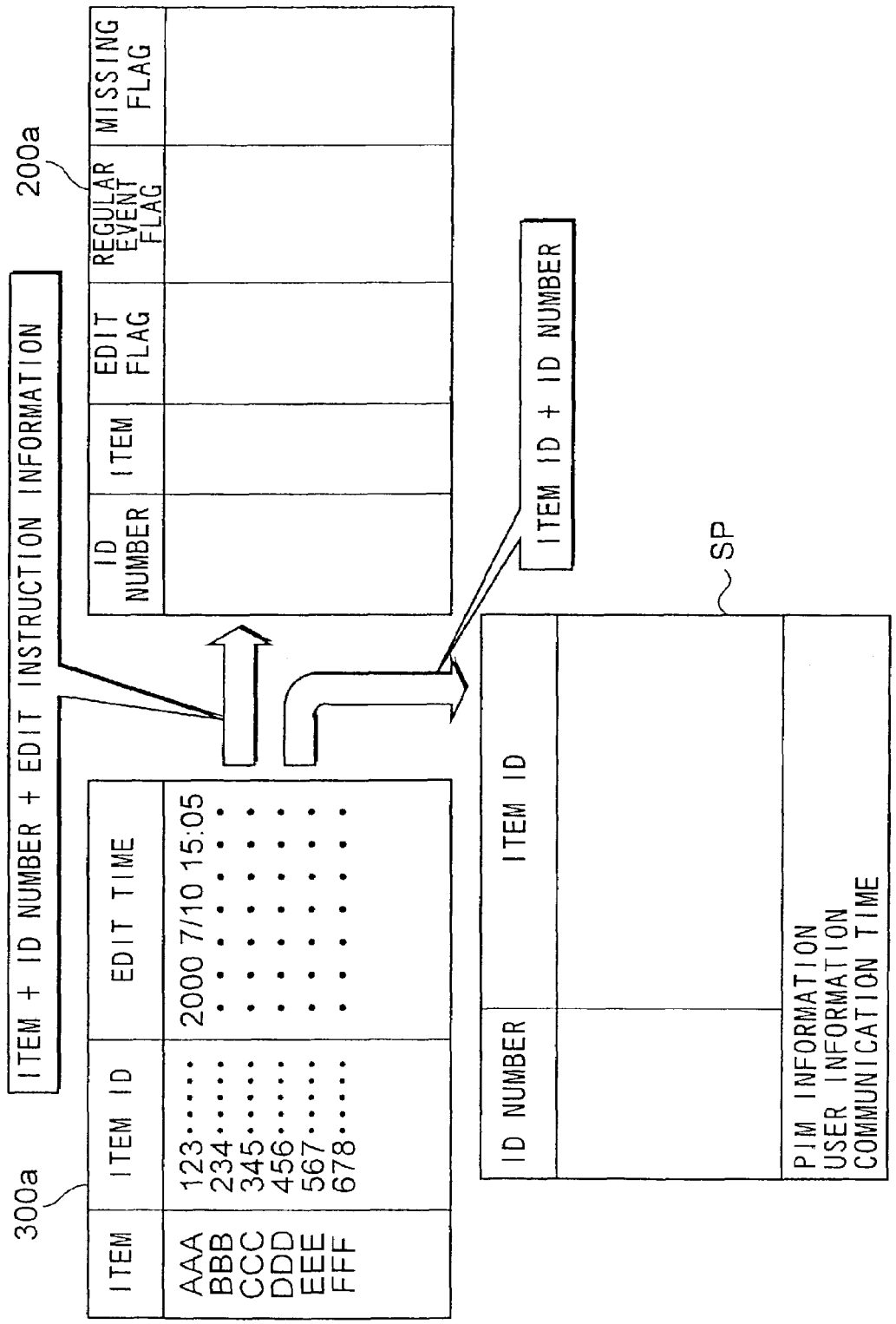
FIG. 2 is a diagram illustrating the principles underlying this data updating method.

In FIG. 1, an example is shown of a schematic configuration of a system to which the data updating method of the first embodiment of the present invention is applied.

An example is shown where application data is created by a predetermined application (hereinafter assumed to be a schedule management application) in a personal computer (PC) 300 and stored in a database of PC 300; the same data also being stored in a database of the handheld information terminal 200.

In the data updating method of the first embodiment, either handheld information terminal 200 or PC 300 initiates data communication with the corresponding device to identify the record of application data stored in the database of the corresponding device with those in its own database, and vice versa, thereby bringing the application data in the databases of the two devices up-to-date.

Handheld information terminal 200 has a Central Processing Unit (CPU), a Read Only Memory (ROM), and a Random Access Memory (RAM), and is capable of performing various functions by implementing schedule management, address management, or similar applications stored in the ROM.

In a flash memory or other similar memory of handheld information terminal 200, a database is provided for storing application data which data replicates that stored in the database of PC 300.

Using, for example, a schedule application provided in the ROM of handheld information terminal 200, a user is able to edit application data stored in a flash or like memory database of the terminal. In doing this, the CPU of the terminal 200 executes the schedule application following instructions from the user.

Handheld information terminal 200 is provided with a band 202 and a body 201, typical of ordinary wristwatches, with all of the electronic devices mentioned above being housed in body 201. A liquid crystal display device 204 is provided in the central part of body 201, the display device 204 being capable of displaying time information, information corresponding to schedule management application data, specifically schedule information, and other types of information.

Handheld information terminal 200 is further provided with a battery for driving the electronic devices of the terminal, including the CPU, and can be accommodated for charging in a charging station 100. To charge the battery of terminal 200 in station 100, once the terminal has been accommodated in the station, a charge button (not shown) is simply depressed.

Station 100 is also capable of relaying data between handheld communication terminal 200 and another information processing device, specifically PC 300. In implementing the data updating method of the present embodiment, handheld information terminal 200 accommodated in station 100 relays data to PC 300 via the station, as shown in FIG. 1.

Data communication between handheld information terminal 200 and PC 300 is not limited to relay via station 100, but can be carried out using a direct cable connection between the devices, or, for-example, a direct connection with wireless technology.

PC 300 is a typical personal computer capable of performing various functions using different applications stored in a storage device such as a hard disk drive.

The storage device of PC 300 is also used to store a database of a schedule application or the like which is provided also on handheld information terminal 200. This database can be edited by a user of a schedule application or the like, as desired.

Since PC 300 and handheld information terminal 200 utilize the same application, and have the same data stored in their respective databases, data can be checked or edited using hand held information terminal 200, when mobile. Similarly, schedule information can be checked or edited through PC 300.

As mentioned, if users of handheld information terminal 200 and PC 300 independently edit application data stored in their own database, the application data stored in the two databases become non-identical to each other. Thus, it becomes necessary to synchronize the contents of the two databases, and the synchronization process is performed through data communication between the two devices, in which application data stored in the database of each device is compared with the memory as of a last previous synchronization process and each database is updated accordingly.

A-2. Database Configuration

FIG. 3 shows a configuration of a database of the present embodiment. Descriptions of the databases of each of PC 300 and handheld information terminal 200 will now be made with reference to the figure.

In database 300a of PC 300 (hereinafter referred to as PC database 300a), for each data information item created using a schedule application, or the like, an item ID is created and stored; further, edit time information for that item is also recorded and stored. Item IDs are ID information used for identifying an item to be processed in the schedule management application that is executed by PC 300. The edit time information indicates the latest date and time of editing such as adding and changing of an item.

A data information item (hereinafter referred to simply as 'item') consists of a unit of data processed by an address-management, schedule management, or similar application. These applications are referred to collectively as Personal Information Managers (PIM). In each item of a database of a schedule management application or the like, there are contained subordinate sets of data which denote planned events such as "start time," "end time," "place," "description of plan," and others. Each set of such data is referred to as a field. In the present embodiment, application data has a hierarchical structure, with a plurality of fields being provided subordinate to an item.

As shown in FIG. 3, items in PC database 300a are stored in a column titled "item". Thus, all subordinate field data of an item is stored in the same location.

When data communication is initiated between handheld information terminal 200 and PC 300 for the first time, PC 300 converts item IDs for all items stored in PC database 300a into identification numbers (ID numbers). These ID numbers are stored along with corresponding item IDs in an update file which is called a synchronization profile SP and which is created in the database of PC 300.

ID numbers comprise a smaller amount of data than item IDs, and by storing these numbers in the database of handheld information terminal 200 (hereinafter referred to as terminal database 200a) to identify item IDs, an amount of data required to be stored in the database can be greatly reduced, and valuable storage space saved.

In the synchronization profile SP created in PC 300, the actual item data of each item is not stored and only the item IDs and ID numbers are stored. Synchronization profile SP contains item IDs and ID numbers updated during a last previous data update operation performed between PC 300 and handheld information terminal 200. Synchronization profile SP also shows a correspondence between an item ID and an ID number.

Further, in synchronization profile SP, there is also stored communication time information which indicates a date and time when a synchronization operation took place previously between handheld information terminal 200 and PC 300, the synchronization profile SP also storing user information and PIM information. The user information is used for identifying a user, and the PIM information shows what kind of PIM (application) is used.

When a data update operation is performed between handheld information terminal 200 and PC 300, the synchronization profile SP is used for detecting items that have been changed by PC 300 since a most recent data communication was performed. In other words, contents of synchronization profile SP in PC 300 are compared with those of PC database 300a to detect items which have been changed in database 300a. Specifically, it is possible to determine which items have been added, changed or deleted by comparing the IDs and the communication time information which have been stored by the most recent communication, with the item IDs and the communication time information which are currently stored in PC database 300a.

As mentioned, synchronization profile SP is stored in PC 300 as a file for use only in a synchronization operation, and its contents are updated each time a synchronization operation is performed between PC 300 and handheld information terminal 200.

In handheld terminal database 200a, in addition to items and ID numbers, for each item, edit flag information, regular event information and missing field flag information are stored. The ID number information is, as described above, ID numbers converted from item IDs of PC database 300a, the ID numbers corresponding to item IDs. When a first communication is performed between PC 300 and handheld information terminal 200, those ID numbers are transmitted to handheld information terminal 200 along with items and other information to be stored therein.

Figure 6:
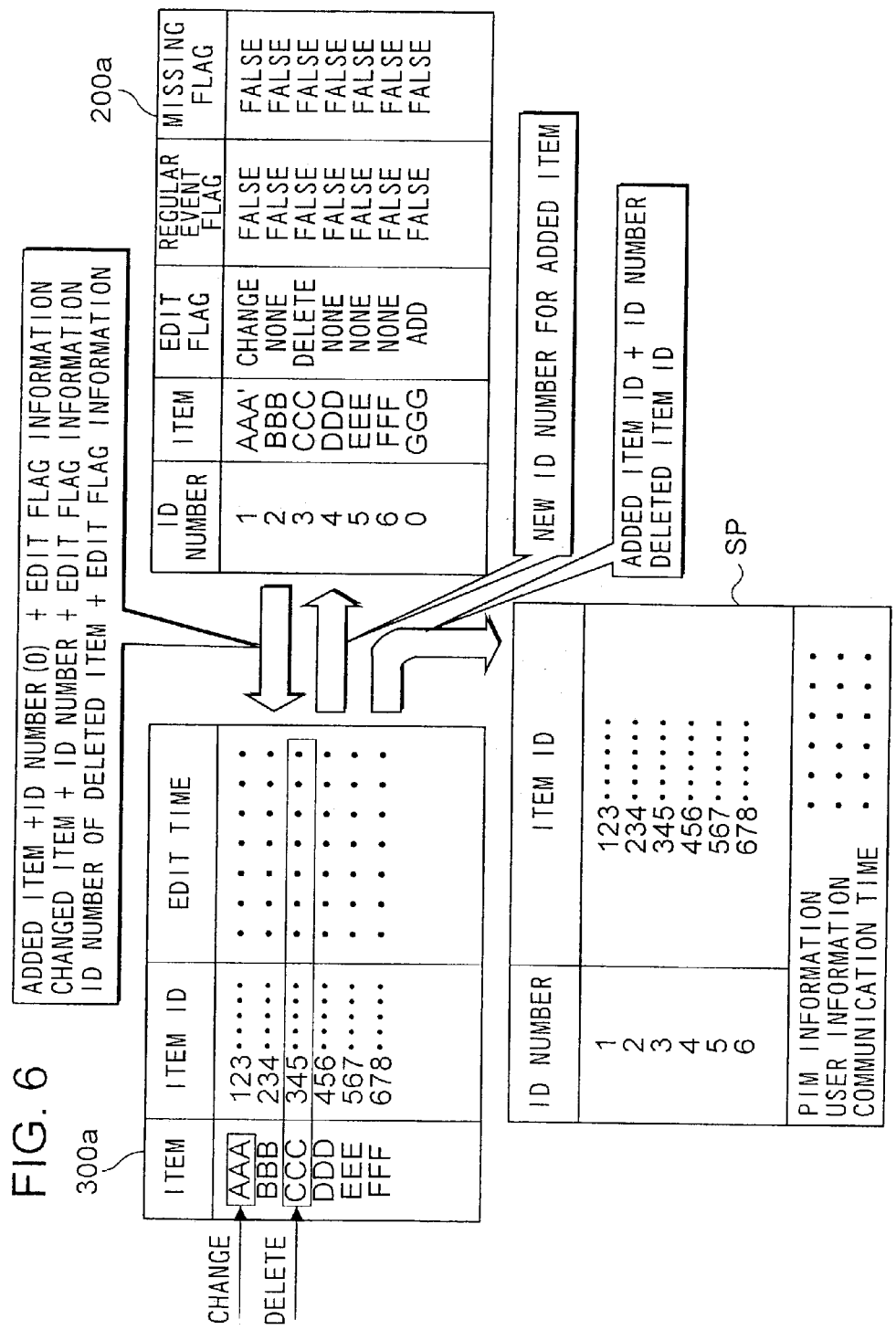
FIG. 6 is a diagram illustrating the principles underlying this data updating method.

As shown in FIG. 6, edit flag information is set to either "ADD," "CHANGE," or "DELETE," to reflect a change which has been made to an item in handheld database 200a. When a synchronization operation is complete, edit flag information is reset to "NONE".

In FIG. 3, edit flag information for all items is set to "NONE" in terminal database 200a. This indicates that no item has been edited following a previous data updating operation.

Regular event information refers to an item created automatically by the application as a regular event instead of being created directly by a user. Such an event could be, for example, information on a periodical meeting held each Monday. In FIG. 3, all regular event information is shown as being set to "FALSE". This indicates that all the items are not regular events created by the application but are created directly by instructions from the user. In the present embodiment, if an item has a corresponding regular event information set to "TRUE", data update will not be performed for that item.

Missing field flag information is a flag added when a number of fields of an item differs between database 200a and database 300a. In some cases, the number of fields of an item which can be included in the databases may differ between databases, depending on an application being used. Specifically, if different applications are used in corresponding devices in performing an update operation, some fields of an item may be erased. The missing field flag information is set to "TRUE" in the above cases.

In the case of FIG. 3, missing field flag information for all the items are set to "FALSE," in which case the missing flag information are ignored when data updating process is performed.

Regular event information and/or missing field flag information are transmitted from PC 300 to handheld information terminal 200 together with item data; handheld information terminal 200, in the case of receiving regular event information and/or missing field flag information, stores the received information in terminal database 200a.

A-3. Data Updating Method

FIGS. 2 to 7 are diagrams showing a principle of the data updating method of the present embodiment, specifically a synchronization operation between handheld information terminal 200 and PC 300. The data updating method with respect to the present embodiment will be described hereinafter with reference to these figures. The data updating method in this embodiment involves a process implemented cooperatively between the two devices responsive to a synchronization processing program stored in each of the devices.

In the present embodiment, two different cases exist where a data update operation is performed between handheld information terminal 200 and PC 300. In a first case, data is transmitted from PC 300 to handheld information terminal 200 when database 200a is in an initial state; namely, data exists at the start of the operation in only PC database 300a. In the other case, data communication is performed when data exists in both databases 300a and 200a, and an update operation is performed on the basis of the respective contents of each of database 300a and 200a.

A-3-1. Data Update Operation Performed when Database 200a is in an Initial State Referring to FIG. 2, description will now be made regarding a case where application data stored in database 300a is duplicated in database 200a, when database 200a is in an initial state; such a state may comprise, for example, a time when data communication between handheld information terminal 200 with PC 300 is first initiated, or when data communication is performed immediately after initialization of handheld information terminal 200.

First, a user creates data using a schedule management application in PC 300. Item IDs and edit time information for each item are stored in PC database 300a (Refer to FIG. 2).

At this stage, no application data has been stored in terminal database 200a because it is in an initial state.

Where PC database 300a contains data and terminal database 200a contains no data, an update operation through data communication between handheld information terminal 200 and PC 300 is performed as follows:

First, PC 300 converts item IDs of all items stored in PC database 300a into ID numbers, and then transmits items, converted ID numbers, and edit instruction information to handheld information terminal 200.

Edit instruction information indicates which one of a process of addition, change, or deletion of an item should be performed in handheld information terminal 200, upon receipt by the terminal of the said information. Receiving the edit instruction information, handheld information terminal 200 performs editing of the subject item according to the information.

In the present case, because the database of handheld information terminal 200 is in an initial state, all items stored in PC database 300a are transmitted to handheld information terminal 200, with edit instruction information also being sent to prompt addition of all items to database 200a.

Then, in PC 300, item IDS and corresponding ID numbers are stored in synchronization profile SP. The correspondence between item IDs and ID numbers for all the items of application data are described in synchronization profile SP.

PC 300 further stores communication time information indicating the communication date and time with handheld terminal 200, user information, and PIM information in synchronization profile SP.

As stated above, referring to the synchronization profile SP allows PC 300 to acquire information such as a date and time a last previous synchronization operation performed with handheld information terminal 200; and item IDs transmitted at the time of the last operation and their corresponding ID numbers information. In the next synchronization operation, the contents of synchronization profile SP are then compared with the contents of PC database 300a, to determine if any item has been newly added, changed, or deleted.

In handheld information terminal 200, all items in database 300a are received, along with ID numbers and edit instruction information corresponding to each item. At this stage, edit instruction information received at information terminal 200 simply instructs that all transmitted items be written in terminal database 200a; as a result, data of all the items are written into terminal database 200a. Concurrently, ID number information for each item is also written in terminal database 200a.

Application data stored in PC database 300a are thus stored in terminal database 200a. Upon completion of this data update operation, identical data exists in each of databases 300a and 200a as shown in FIG. 3.

In addition to storing items and ID number information in terminal database 200a, as mentioned above, edit flag information, regular event information, and missing field flag information are also stored in database 200a.

A-3-2. Data Updating Implemented based on Items Edited in PC 300

When Terminal Database 200a is in an Initial State, Application Data Stored in PC Database 300a is Transmitted to Handheld Information Terminal 200 to be Written into and Stored in Terminal Database 200a.

Accordingly, in terminal database 200a and PC database 300a identical application data can be stored as shown in FIG. 3.

Following completion of a data update operation, application data stored in databases 300a and 200a may be modified, and a further update operation needs to performed, whereby data modified in one device is identified to enable the device storing the information to update the database of the other device, and vice versa.

Figure 4:
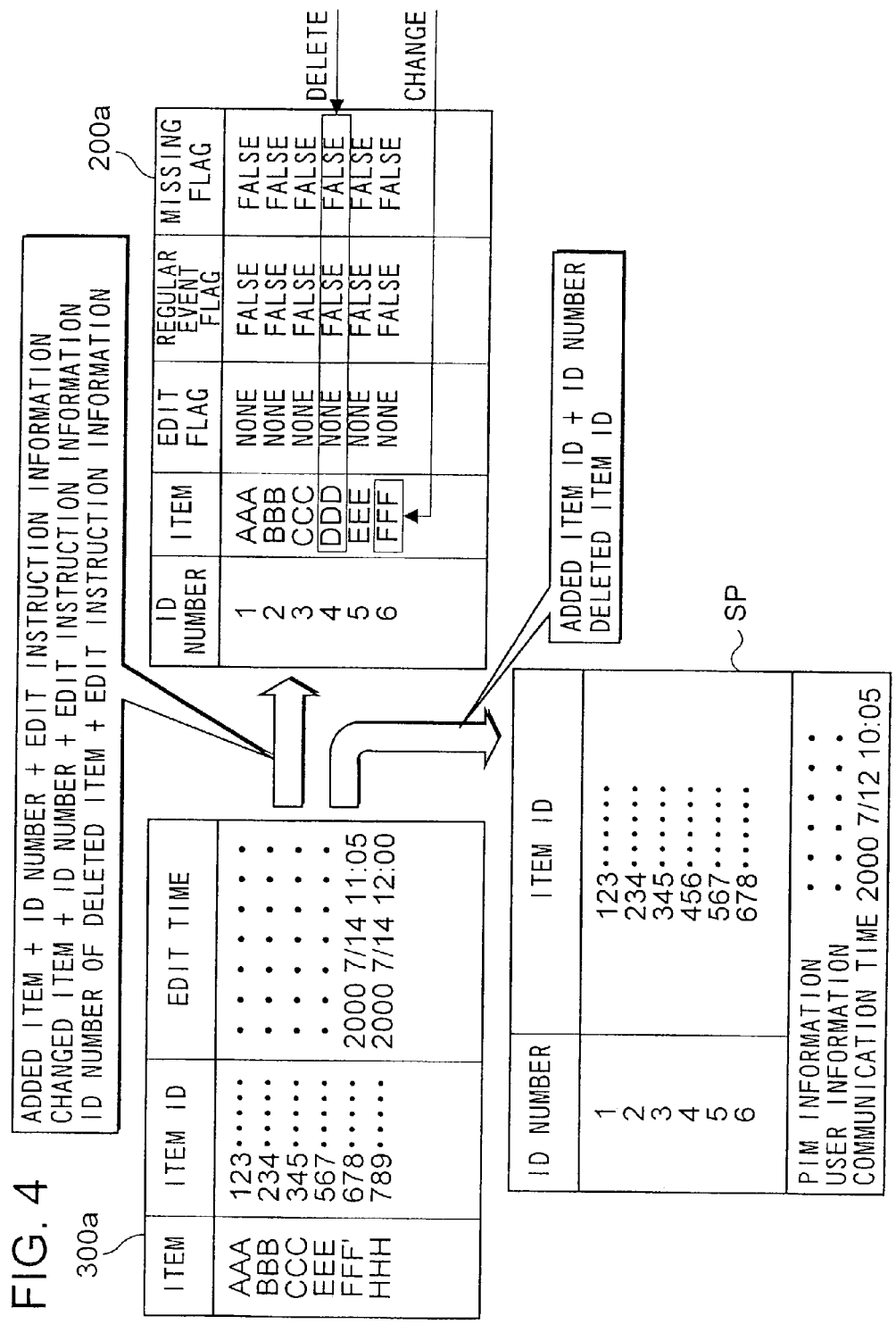
FIG. 4 is a diagram illustrating the principles underlying this data updating method.

Reference is now be made to FIG. 4 and FIG. 5 in describing a method for detecting items edited in database 300a, to enable data in terminal database 200a to be updated.

In FIG. 4, it is shown that a new item "HHH" has been added; item "DDD" has been deleted; and item "FFF" has been changed to "FFF" following completion of a previous data update operation; changes have been made to the records of the terminal database 200a stored on completion the above described case of a data update operation when the terminal database 200a was in an initial state.

In the data update process of the present embodiment, when editing of items is performed in PC 300 after completion of a previous update, item IDs of items that have been added, changed, or deleted in PC 300 are detected to be transmitted to handheld information terminal 200. In this embodiment, only data relating to edited items is transmitted to terminal 200, and information on items without changes is not transmitted.

Consequently, edited items must be detected first. In the present embodiment, this detection is carried out as follows:

First, description will be made regarding detection of items added to database 300a, following completion of the previous data update operation.

In this case, added items are detected by comparing the contents of the synchronization profile SP with those of database 300a.

To be more specific, item IDs and ID number information are stored in the synchronization profile SP, the item IDs and ID number information identifying items stored in the databases as of the previous data updating.

This means that items IDs for items that have been added after the completion of the previous update are not stored in the synchronization profile SP. Therefore, PC 300 detects item IDs that are not stored in the synchronization profile SP out of the item IDs stored in PC database 300a, and the detected items are determined to be newly added items.

In the example shown in FIG. 4, in synchronization profile SP, there is no item ID stored corresponding to item "HHH" in PC database 300a. The item "HHH" is thus determined as a newly added item.

Next, description will be given as to how to detect items that have been changed at PC 300 following completion of the previous data update.

The contents of the synchronization profile SP is compared with those of the PC database 300a as well, in order to detect changed items.

Concretely, the synchronization profile SP stores communication time information indicating a date and time of a most recent previous data updating operation; while PC database 300a stores edit time information indicating a most recent editing date and time for each item. Among items stored in PC database 300a, items that correspond to item IDs stored in each of the synchronization profile SP and the PC database 300a and whose edit time information is later than the communication time information stored in the synchronization profile SP are determined to be changed items.

In the example shown in FIG. 4, item "FFF" can be determined as a changed item because its items ID is stored in each of the databases and its edit time information is later than that of the communication time information.

Item IDs for items deleted at PC 300 following completion of the previous synchronization operation are detected as follows:

First it should be noted that, in this case, the memory of synchronization profile SP and those of PC database 300a will be compared to detect deleted items.

Specifically, in synchronization profile SP there is stored item IDs for identifying items stored in each database as of the previous data update operation; while, PC database 300a stores existing items, its item IDs, and other corresponding information, but no information on deleted items.

Thus, PC 300 selects item IDs that are not stored in PC database 300a from those stored in synchronization profile SP and determines that items corresponding to the selected item IDs have been deleted.

In the example shown in FIG. 4, item ID "456 . . . " of the synchronization profile SP is not stored in PC database 300a (Refer to FIG. 3). Therefore, item "DDD" corresponding to item ID "456 . . . " is determined to be a deleted item.

As described above, item IDs that have been added, changed, or deleted following a most recent data updating operation can be detected by comparing contents of the memory of PC database 300a with those of the synchronization profile SP. Items are retrieved only for newly added and changed item IDs.

By the data updating method of the present embodiment, it is therefore possible to detect edited items using item IDs and edit time information thereof, and item IDs as of a most recent data updating operation and time information thereof. In this respect, the method of the present embodiment differs from a conventional method which compares contents of items as of a most recent previous updating operation with contents of items presently stored in a database to detect edited parts of the items. It will be apparent, then, that in the data updating method of the present embodiment, edited items can be detected more quickly than in the conventional method; and, further, it is possible to perform effective data updating especially when an amount of items is large.

Furthermore, in the conventional method, an amount of data stored in a synchronization profile becomes large because all data for items as of the completion of a most recent previous data updating operation have to be stored in the synchronization profile. In the method of the present embodiment, to the contrary, the actual data for items are not stored in the synchronization profile SP but rather only item IDs of items and corresponding ID numbers are stored. Consequently, an amount of data stored in a synchronization profile SP can be minimized even in a case where a total amount of data for items is large.

As described above, when item IDs for added and changed items are detected at PC 300, PC 300 transmits to handheld information terminal 200 data of added or changed items and ID numbers corresponding item IDs, along with edit instruction information directing either add or change.

Item IDs of changed items are converted into ID numbers by referring to the correlation between item IDs and ID numbers stored in the synchronization profile SP. A new ID number will be assigned to the item IDs of the added items, and the new ID number and its item ID will be stored in the synchronization profile SP.

Furthermore, PC 300 transmits to handheld information terminal 200 ID numbers of item IDs that have been deleted as well as edit instruction information directing deletion of items identified by the transmitted ID numbers. In addition, item IDs and corresponding ID numbers of the deleted items are deleted from the synchronization profile SP.

On the other hand, handheld information terminal 200 receives added or changed items, edit instruction information, and ID numbers identifying deleted items that have been transmitted from PC 300.

In the case of items indicated by edit instruction information as newly added, they are stored along with their ID numbers in terminal database 200*a*.

In the case that an item is indicated by edit instruction information as being changed, the changed item transmitted from PC 300 is written over their previous versions stored in an area of terminal database 200*a*, which area can be identified by the identification number of the changed item transmitted from PC.

In the case of items indicated by edit instruction information as deleted, items identified by ID numbers, edit flag information, and other related information will be deleted from terminal database 200*a*.

As described, application data stored in terminal database 200*a* is updated on the basis of items that have been edited at PC 300 following completion of a most recent previous data updating operation. As a result, as shown in FIG. 5, application data stored in PC 300 and handheld terminal device 200, following completion of a data updating method, is identical.

A-3-3. Data Updating Based on Items Edited in Handheld Information Terminal 200

Reference is now made to FIG. 6 and 7 in describing updating of application data stored in PC database 300*a* of PC 300 after detection of edited items at handheld information terminal 200.

FIG. 6 shows that in a handheld information terminal 200, a new item "GGG" has been added, item "CCC" has been deleted, and item "AAA" has been changed to "AAA'" after completion of a most recent previous data updating operation (refer to FIG. 3).

In the data updating operation of the present embodiment, when editing of items is performed at handheld information terminal 200 after completion of a data updating operation, ID numbers of items that have been added, changed, or deleted by handheld information terminal 200 are detected to be transmitted to PC 300. Actual items are transmitted to PC 300 only of the added items or changed items, not of deleted items.

Consequently, it is necessary to detect edited items first. Edited items are detected in the present embodiment in the following manner.

First, handheld information terminal 200 detects items that have been added, changed, or deleted following completion of a most recent previous data updating operation by reference to edit flag information stored in) terminal database 200*a*.

As described above, edit flag information is set when either one of the editing operations is made at handheld information terminal 200 such as adding a new item, changing data of items, and deleting items. Consequently, it is possible to detect items that have been edited following completion of a most recent previous data updating operation by reference to the edit flag information.

In the example shown in FIG. 6, item "AAA'" with its edit flag information set to "CHANGE" is determined to be a changed item. Item "GGG" with its edit flag information set to "ADD" is determined to be a newly added item. Item "CCC" with its edit flag information set to "DELETE" is determined to be a deleted item.

In the case that new or changed items are detected at handheld information terminal 200, data including the item in the former case, ID numbers, and appropriate edit flag information showing either "ADD" or "CHANGE" are transmitted to PC 300.

In the case that new items are created at handheld information terminal 200, as no ID numbers have been assigned by PC 300, a provisional ID number "0" is assigned to new items added at handheld information terminal 200. When deleted items are detected, ID numbers corresponding to the items and edit flag information indicating that the items have been deleted are transmitted to PC 300.

After transmitting the data to PC 300, handheld information terminal 200 resets the relevant edit flag information to "NONE," and deletes all data for the deleted items.

When PC 300 receives data transmitted from handheld information terminal 200, it performs one of the operations as follow:

In the case of items indicated by edit flag information as being changed, ID numbers of the items are converted to item IDs by referring to the synchronization profile SP. The data of the changed items that have been transmitted from handheld information terminal 200 is written over to replace the data presently stored in an area of PC database corresponding to the item IDs.

In the case of items indicated by edit flag information as being deleted, ID numbers of the items are converted to item IDs by referring to the synchronization profile SP, and the item IDs and data of corresponding items are deleted from PC database 300*a*. PC 300 deletes not only the data from PC database 300*a*, but also item IDs and the ID numbers from the synchronization profile SP.

In the case of items indicated by edit flag information as being newly added, the items are newly stored in PC database 300*a*. Then, item IDs are assigned to each of new items using the schedule management application stored in PC 300. These item IDs are then converted into ID numbers, item IDs and ID numbers are newly stored in the synchronization profile SP. Next, the ID numbers and data of corresponding items are transmitted to handheld information terminal 200.

Handheld information terminal 200, upon receiving the data, stores the received ID number in an area under the column of ID number of terminal database 200*a*, which corresponds to an item the same as those transmitted from PC 300, specifically a cell with the ID number "0" of FIG. 6.

As described above, application data stored in PC database 300*a* is updated based on items that have been edited at handheld information terminal 200 following completion of a previous data updating operation. Thus, following completion of a new updating operation, as shown in FIG. 7, the databases of handheld information terminal 200 and PC 300 will contain identical application data.

In the data updating method with respect to the present embodiment, it is easy to detect edited items by reference to the edit flag information stored in terminal database 200*a* of handheld information terminal 200. Only data for edited items are transmitted to PC 300. Therefore, it is also easy for a receiver, PC 300, to perform a data updating process, because only the edited contents of the received items need to be reflected in its own PC database.

Although description has been made for cases where editing takes place at only one of either handheld information terminal 200 or PC 300, it is possible, in the case where editing of application data is performed in both devices following the completion of a previous data updating operation, to implement not only data updating process based on edited items at PC but also data updating process based on edited items at handheld information terminal.

If different editing has been performed on the same item in different devices, it is possible to notify a user to enable the user to select a desired one of the differently edited items.

Alternatively, when edit time information has been recorded at handheld information terminal 200, it is possible to compare the edit time information of PC database 300*a* and that of the terminal 200 with regard to an item on which an editing operation has been performed at each of the devices to automatically select contents edited at a later time or date and perform a data updating operation.

A-4. Operations of PC and Handheld Information Terminal

Operations for implementing the data updating method which employs the principle explained above, with respect to the present embodiment, will now be described.

The operations at each device are performed following instructions issued by a synchronization processing program for handheld terminal 200 and a synchronization processing program for PC 300, each program being preloaded in a storage means of each device.

First, handheld information terminal 200 and PC 300 are connected to each other for communication, and when data updating is instructed by a user, PC 300 determines whether a full or partial updating operation should be performed.

In a full updating operation, data updating is performed, as described above, when terminal database 200*a* is in an initial state. In a full updating operation, regardless of whether data are edited at PC 300, all the items that are predetermined as data to be updated are transmitted to handheld information terminal 200 to be written into terminal database 200*a*.

Partial updating is a data updating operation, as described above, on the basis of units edited at PC 300 or handheld information terminal 200. However, only items edited following completion of a most recent previous data updating operation are transmitted to the other device.

When data updating between handheld information terminal 200 and PC 300 is instructed, PC 300 determines whether to perform either a full or partial updating.

Figure 8:
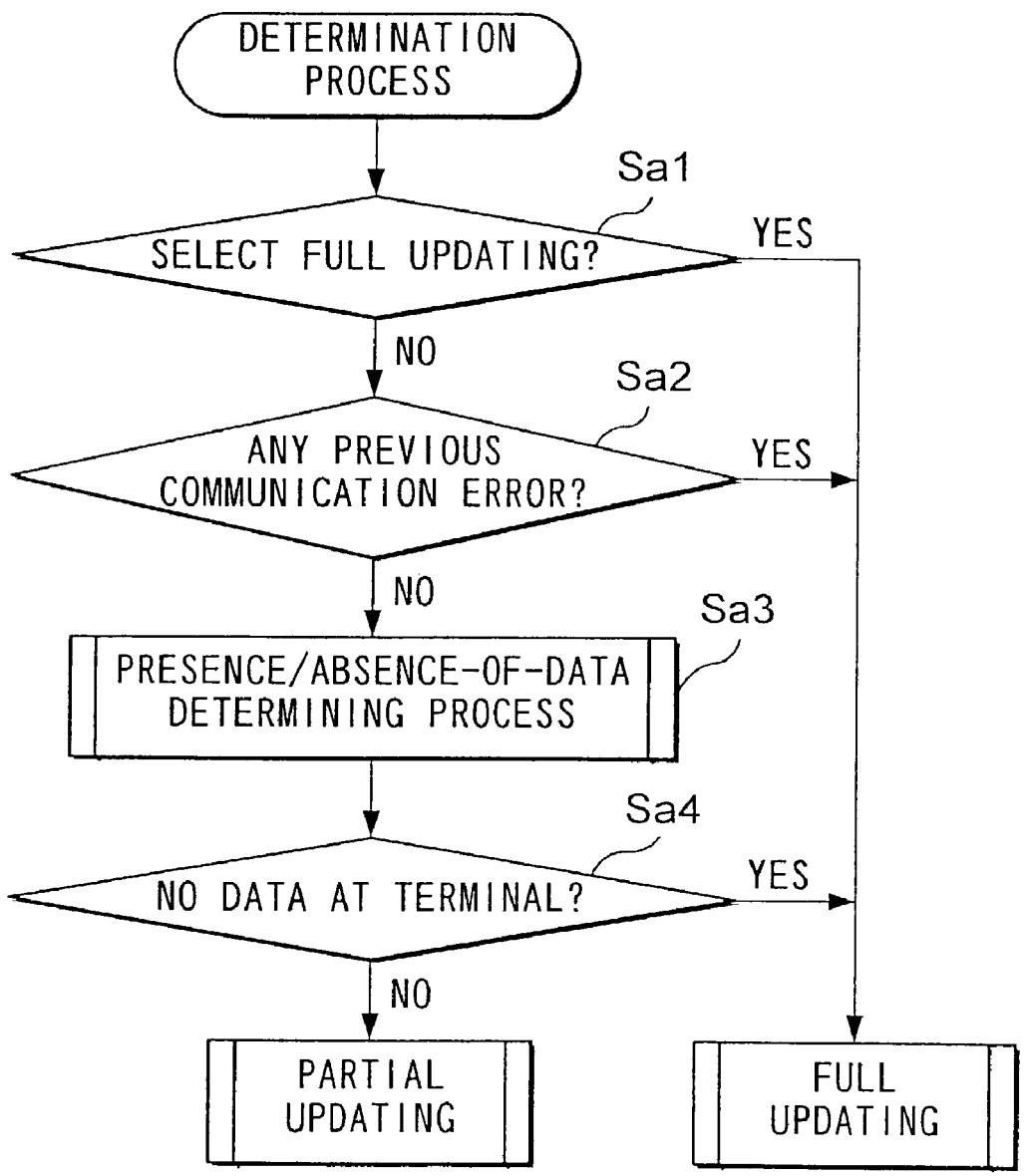
FIG. 8 is a flow chart illustrating a process for implementing the data updating method; and specifically a determining process implemented by a personal computer (PC), which is a component of the system.
Figure 9:
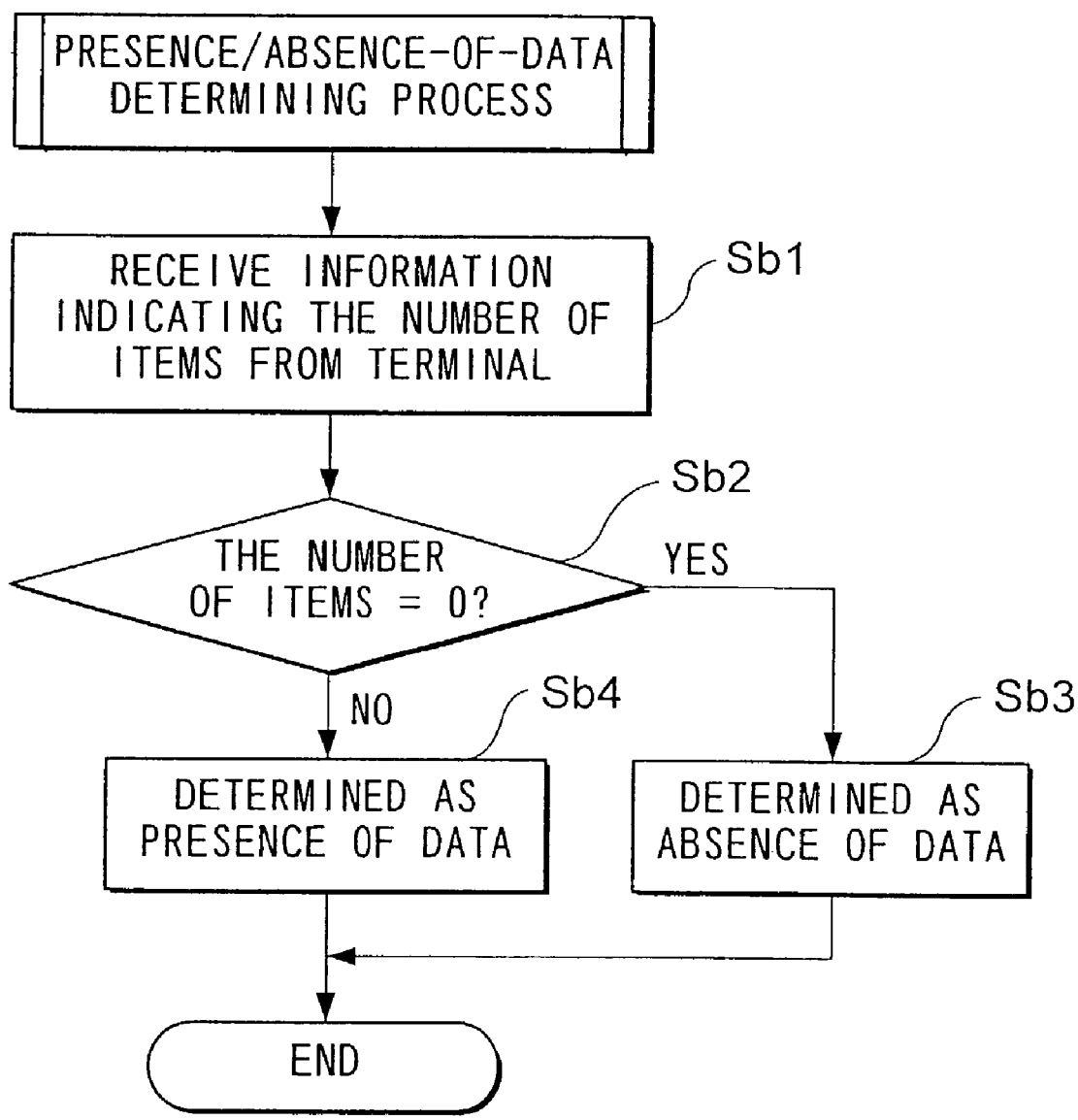
FIG. 9 is a flow chart illustrating a process for implementing the data updating method; and specifically a presence/absence-of-data determining process implemented by the PC.

FIG. 8 is a flow chart showing the procedure of the determining process. FIG. 9 is a flow chart describing the procedure of one step "determining process of data presence or absence" (Step Sa3) of the determining process shown in FIG. 8. The determining process will now be described with reference to FIG. 8 and FIG. 9.

When the determining process is started, it is determined whether a full updating operation is designated by a user (step Sa1).

In this step, the user can instruct a forced full updating by operating PC 300. A user sometimes desires to initialize the memory of handheld information terminal 200, specifically terminal database 200*a*, to write application data again in the database because the memory could be cluttered with application data already existing in terminal database 200*a* as a result of repeated data updating. The memory is not effectively used here, which could cause delay in processing.

The user can select a full updating in such a case, so that all data in terminal database 200*a* is deleted, and entire application data stored in the database of PC 300 are written into terminal database 200*a*. As a result, data in the memory is effectively stored.

When a full updating is selected by a user as in the above case (step Sa1; YES), a full updating operation is performed.

When a full updating operation is not selected by a user, it is determined whether communication errors took place at the time of a last previous data updating communication and whether the range of data to be updated has been changed or not (step Sa2).

In the case that there is any error that took place during the previous communication, application data stored in terminal database 200*a* could have some deficiencies caused by an irregular data updating.

In the case that there is any change in the range of data units to be updated, that is, when data to be updated is changed from the previous updating operation, no corresponding data is stored in terminal database 200*a* to be updated in a new updating operation.

Therefore, when there was an error in the previous communication or the range of data for update is changed in a new updating operation (step Sa2; YES), a full updating operation is performed.

On the other hand, when there was no error or change (step Sa2; NO), a process is performed for determining whether application data to be updated are stored in terminal database 200*a* (step Sa3).

FIG. 9 shows details of the determining process of step Sa3. As shown in the figure, PC 300 first receives from handheld information terminal 200 information indicating the number of items stored in terminal database 200*a* (step Sb1).

Next, it is determined whether the number of items indicated in the received information is zero or not (step Sb2). In the case that the number of items stored in the terminal database 200*a* is zero (step Sb2; YES), it is determined there is no application data in terminal database 200*a* (step Sb3), and the determining process is completed.

In the case that the number of items stored in terminal database 200*a* is not zero; in other words, application data are stored in terminal database 200*a* (step Sb2; NO), it is determined that there is data stored in terminal database 200*a* (step Sb4), and the determining process is completed.

When the determining process shown in FIG. 9 is completed, the routine returns the process shown in FIG. 8. The presence or absence of application data at handheld information terminal 200 is then determined on the basis of a result obtained in step Sa3 (step Sa4).

In the case that it is determined that there is application data stored in the database of handheld information terminal 200 in the above determining process (step Sa4; NO), a partial updating operation is performed.

In the case that it is determined that there is no application data in terminal database 200a in the above determining process (step Sa4; YES), a full updating is performed.

This is how the process is performed for determining whether to perform a full or partial updating.

The operation of each device in data updating between PC 300 and handheld information terminal 200 will now be described, especially in the case of partial updating, with reference to FIG. 10. The operation in the case of full updating will not be described because the process is the same as the case of updating data when terminal database 200a is in an initial state.

Figure 10:
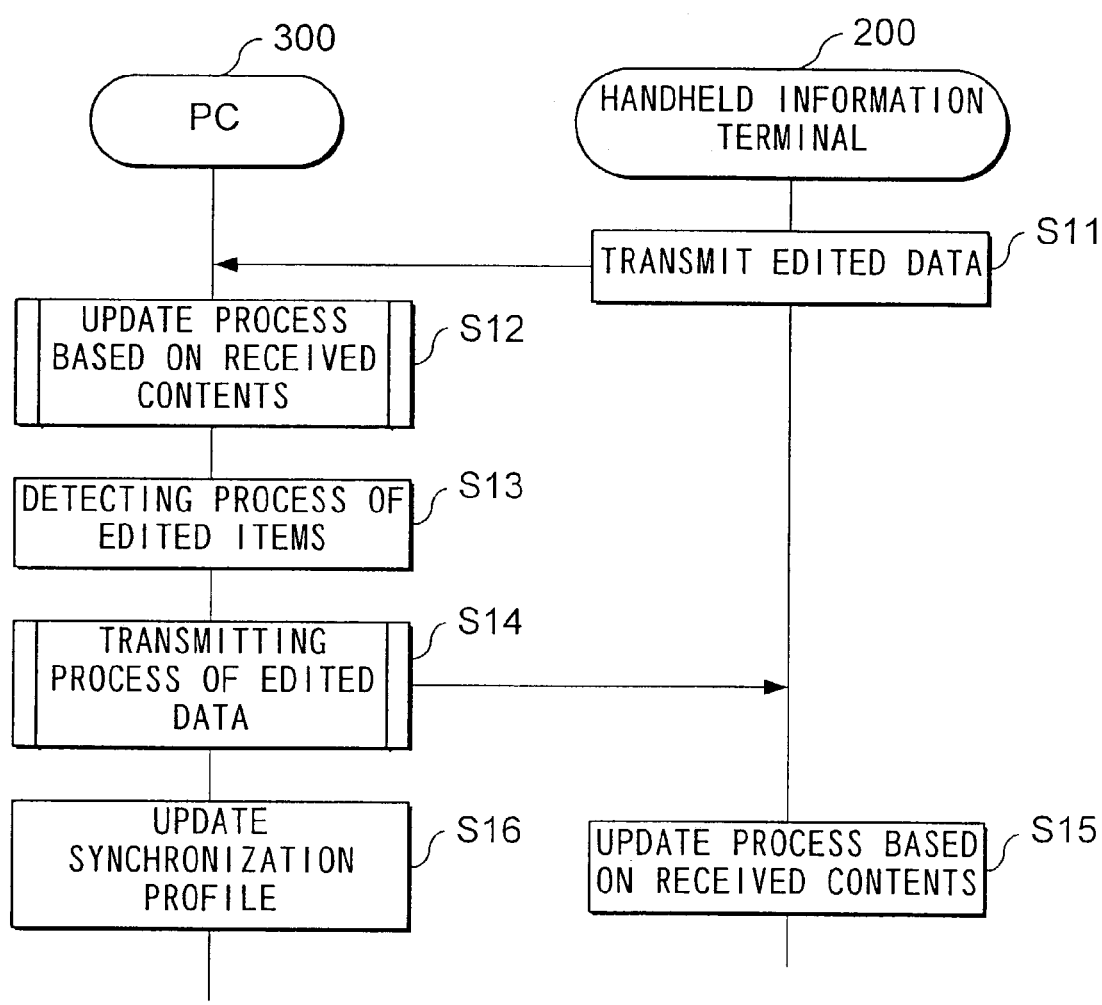
FIG. 10 is a flow chart illustrating a processing operation sequence, used for implementing the data updating method between the PC and a handheld information terminal, which is also a component of the system.

FIG. 10 is a flow chart illustrating a processing operation sequence, used for updating data between handheld information terminal 200 and PC 300 in the case of partial updating. Among the steps shown in FIG. 10, more detailed description will be made for each of a process in step S12 where PC 300 updates its own PC database on the basis of received contents and a process in step S14 where PC 300 transmits edited data in FIG. 11 and 16 respectively.

As shown in FIG. 10, when a partial updating is performed, data of edited items and related data are transmitted from handheld information terminal 200 to PC 300 (step S11). Handheld information terminal 200 refers to edit flag information of terminal database 200a to detect which item has been edited, and only data relating edited items are transmitted to PC 300.

To be more specific, in the case that a new item is detected, data of the new item with its provisional ID number, and edit flag information indicating that the item is newly added are transmitted to PC 300. When a changed item is detected, data of the changed item with its ID number, and edit flag information indicating that the item has been changed are transmitted to PC 300. In the case that a deleted items is detected, an ID number of the item and edit flag information indicating that the item has been deleted are transmitted to PC 300.

PC 300 receives the data from handheld information terminal 200, and updates data stored in its own PC database 300a on the basis of the received data (step S12).

Figure 11:
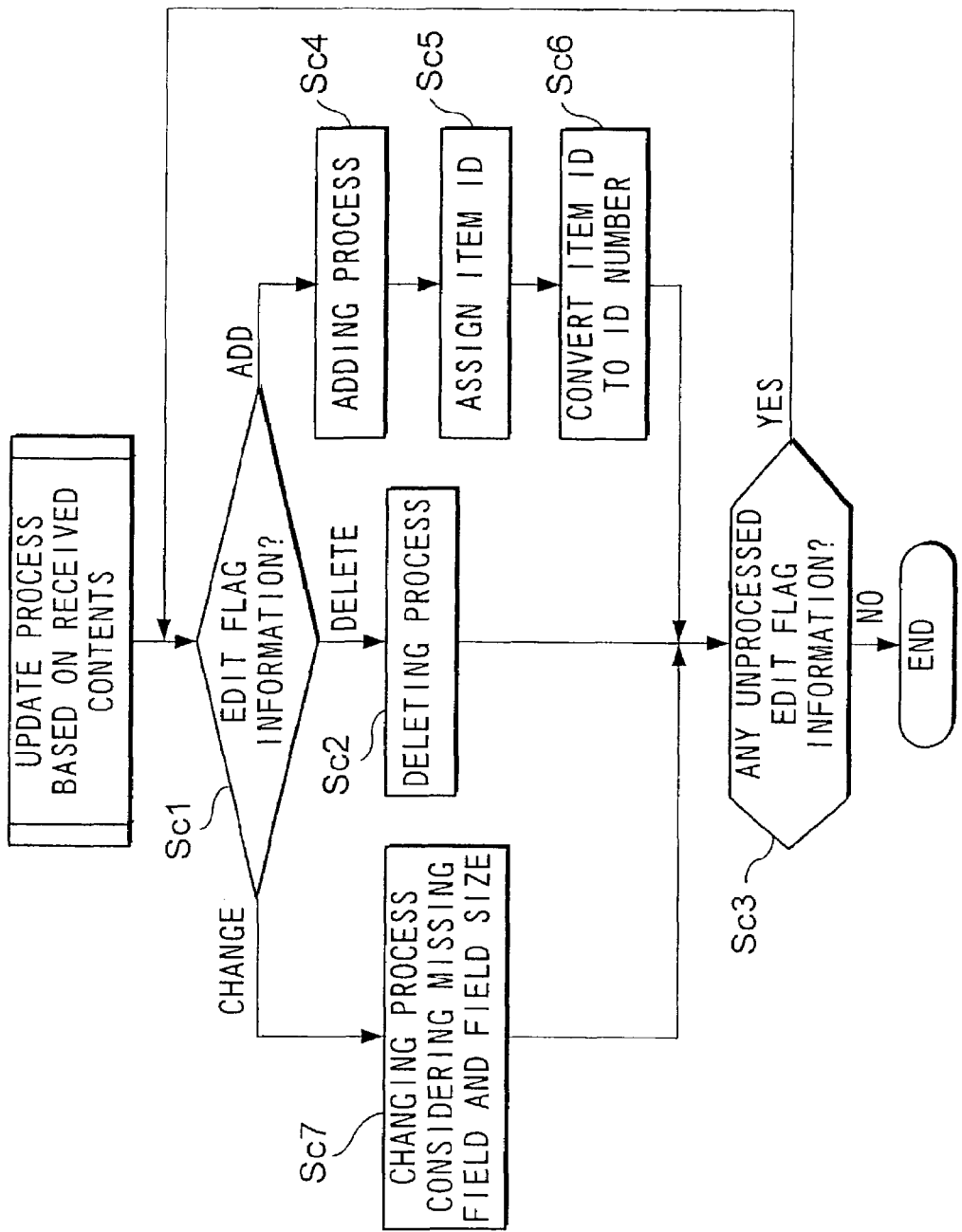
FIG. 11 is a flow chart illustrating a process for implementing the data updating method; and specifically a data update process wherein data is received by the PC from the handheld information terminal, with the process being implemented by the PC.

The procedure of the updating operation in step S12 is further described in FIG. 11. First, PC 300 refers to edit flag information included in the received data to determine whether received items are newly added, changed, or deleted items (step Sc1).

In the case of an item indicated as deleted in its corresponding edit flag information, an item ID of the deleted item is obtained from synchronization profile SP, the obtained item ID corresponding to the ID number included in the received data. Then, an item identified by the obtained item ID is deleted from PC database 300a (step Sc2).

Next, it is determined whether there is any edit flag information that has not been processed in the received data (step Sc3). In the case that there is unprocessed edit flag information, the routine returns to step Sc1. In the case that no unprocessed edit flag information is found, it is determined that an updating process for all items received from handheld information terminal 200 is finished, and the process is then completed.

In the case of an item indicated as newly added in its corresponding edit flag information in the determination of step Sc1, data of the newly added item is written into PC database 300a, and PC database 300a creates a record of the new item (step Sc4). Subsequently, PC 300 executes an application to assign an item ID to the newly created item (step Sc5). The assigned item ID is then converted to an ID number (step Sc6).

Next, the routine proceeds to step Sc3, and it is determined whether there is any edit flag information that has not been processed as in the case of the above deleting process.

In the case of an item indicated as changed in its corresponding edit flag information in the determination of step Sc1, PC 300 makes changes on data of the changed item. In making changes, the presence or absence of missing fields and difference of field sizes are considered (step Sc7).

Figure 12:
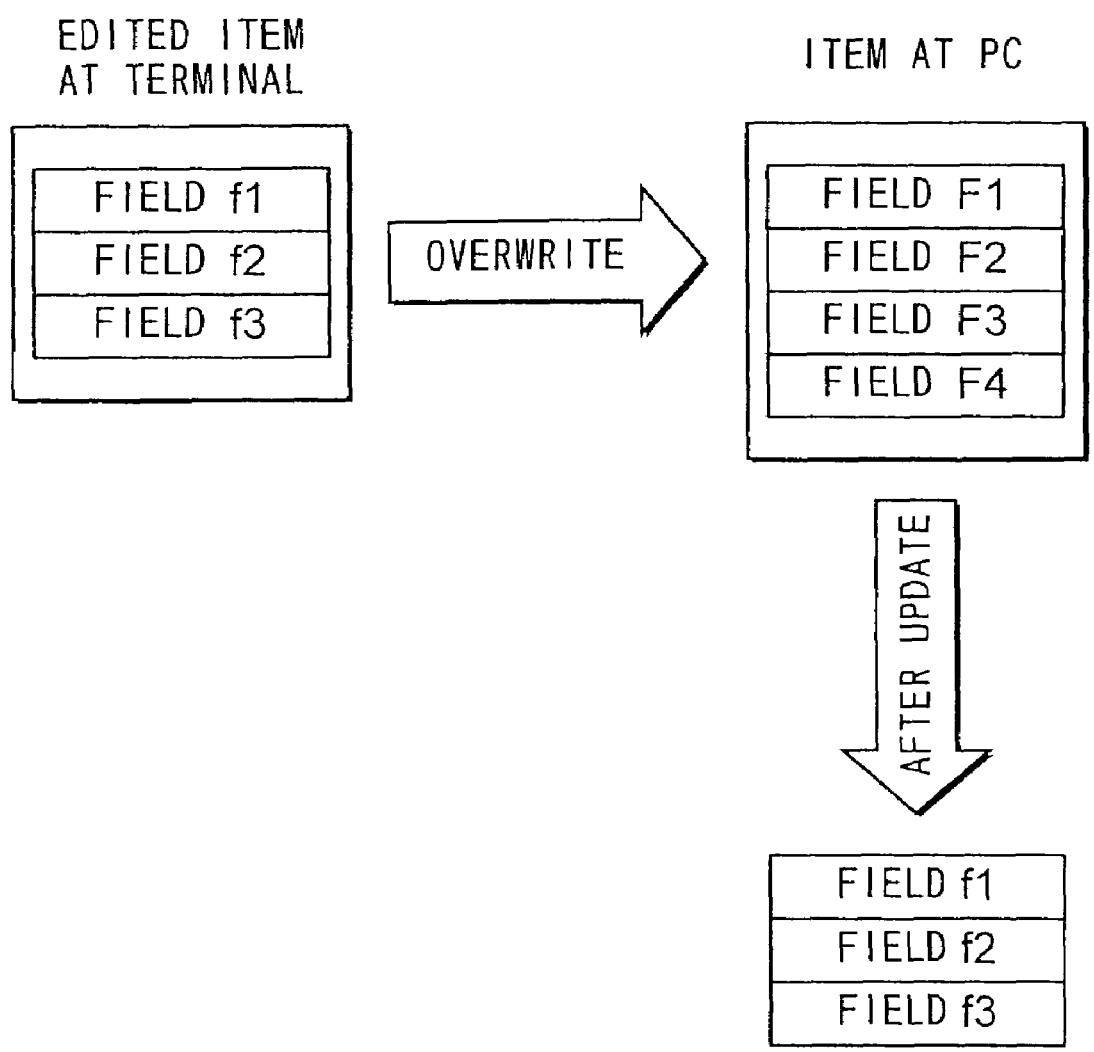
FIG. 12 is a diagram illustrating a problem which arises in a case where the number of the fields of an item differs between the PC and the handheld information terminal, wherein the item is a data unit processed by each of the PC and the handheld communication terminal.
Figure 13:
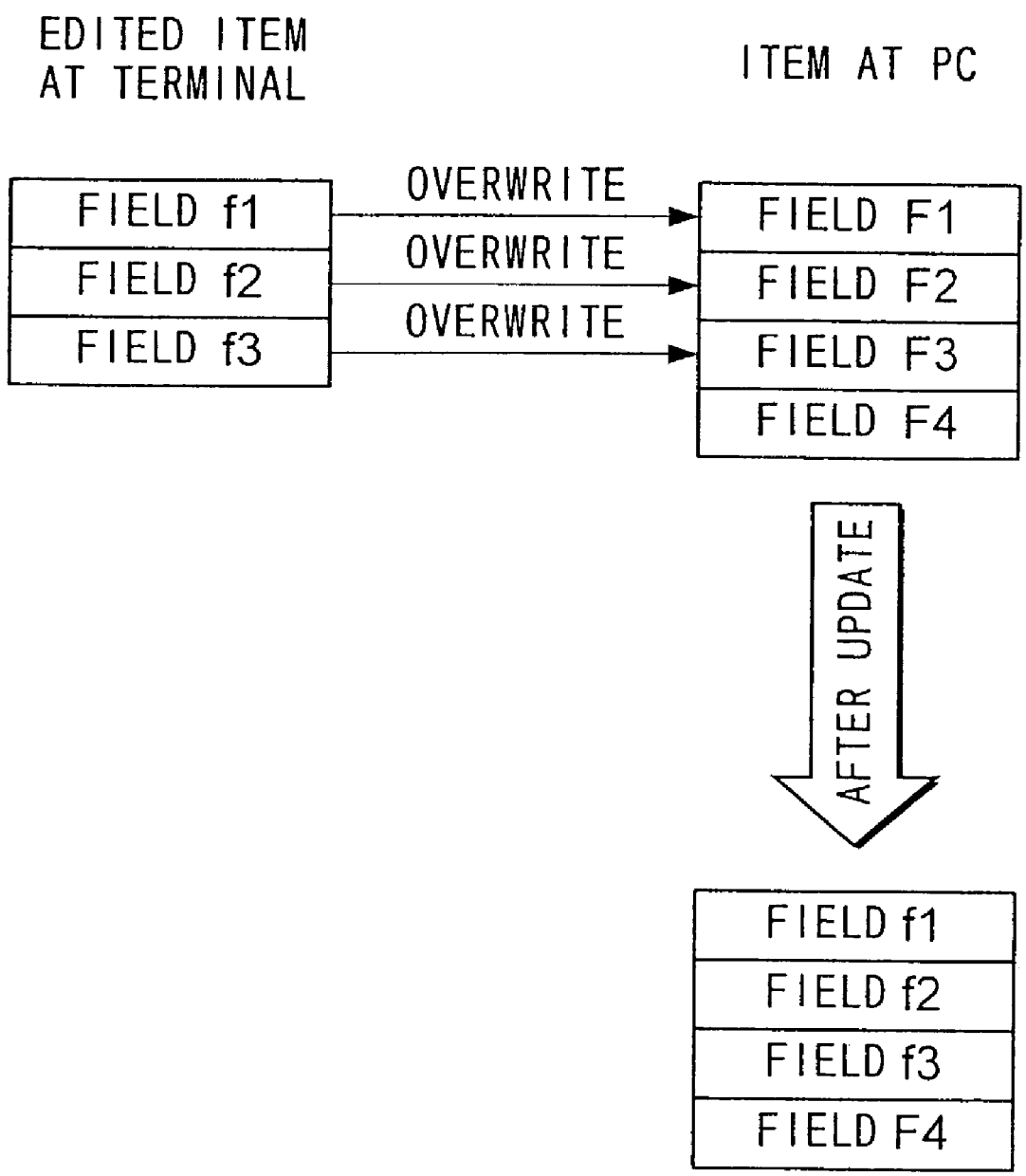
FIG. 13 is a diagram illustrating a processing method used in the data updating method of the present invention in a case that the problem described above exists with respect to an item which is the subject of an update operation.
Figure 14:
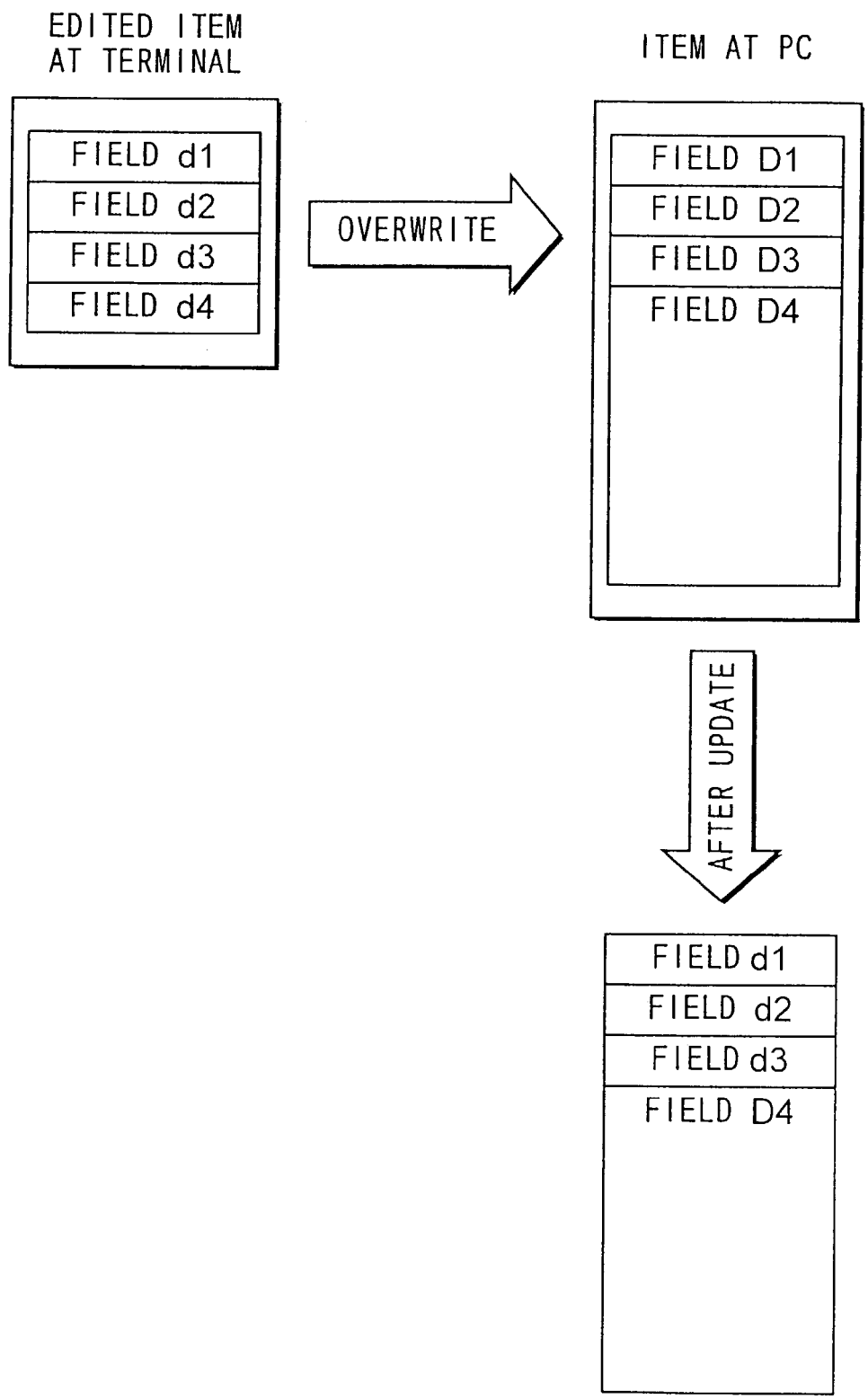
FIG. 14 is a diagram illustrating a problem which arises in a case where, between the PC and the handheld information terminal, a maximum data size of a field of an item differs.

Reference is now made to FIG. 12 to 14 to discuss missing field, field size, and a data updating operation considering them.

As described above, in the present embodiment, an ID number is assigned to each item, and data of each item in a database consists of a plurality of subordinate fields. The number of fields contained in each item varies depending on PIM, an application software; thus, an item stored in each of two databases could contain subordinate fields which differ in number between handheld information terminal 200 and PC 300. When a data updating operation is performed without considering the difference in the number of fields, a problem could arise as described below.

For example, as shown in FIG. 12, we assume that data of a changed item are transmitted from handheld information terminal 200 and that the item consists of three subordinate fields. We also assume that data of an item, in PC database 300a, to be updated based on the received data consists of four subordinate fields. When the received data of the item with three subordinate fields is overwritten onto the corresponding item in PC database 300a to replace existing data of the item with four subordinate fields, data of field F4 will be deleted. In the present embodiment, a field such as is deleted as field F4 is referred to as a missing field.

To prevent necessary data from being deleted as in the above case, when edit flag information indicates that an item corresponding thereto has been changed, the presence or absence of missing field is determined by referring to data of the changed item.

When the number of fields contained in a received changed item is smaller than that of a corresponding item in the database 300a, it is determined that there is a missing field. When the number of fields contained in a received changed item is larger than or equal to that of a corresponding item in the database 300a, it is determined that there is no missing field.

When it is determined that there is no missing field as a result of the determination of the presence or absence of a missing field, a normal changing operation is performed to overwrite received data of an item onto data of a corresponding item in PC database 300a to replace an existing version.

On the other hand, when it is determined that there is a missing field, the following process will be performed. As shown in FIG. 12, a missing field, in this case, field F4, will be stored as is in PC database 300a because otherwise field F4 would be deleted. Then, only the fields F1 to F3 of the PC database are replaced with fields f1 to f3 of the received item.

Consequently, as shown in FIG. 13, fields f1 to f3 and field F4 are stored in PC database 300a when the updating operation is completed.

Field size is a maximum data size that can be stored in a field of an item in each of terminal database 200a and PC database 300a. The field size sometimes differs between the two databases depending on an application as in the case of missing field.

In particular, memory capacity in a storage device in small terminals such as handheld information terminal 200 is typically smaller than that of PCs; a maximum data size of a field, as described above, is sometimes set smaller compared to that of PCs. We assume here that, as in FIG. 14, the size of field D4 of an item stored in PC database 300a is larger than that of field d4 of an corresponding item stored in terminal database 200a. If data for update is received from handheld information terminal 200 in such a case, field D4 of a larger size in PC database 300a would be deleted to be replaced with field d4 of a smaller size.

To prevent field D4 from being deleted, data stored in field D4 before updating is left as is, and at the same time data of field d4 received from handheld information terminal 200 is added to field D4.

To be more specific, when data "it is very fine day today" is stored in field D4, and data "fine tomorrow" is transmitted from handheld information terminal 200, the data of field D4 will be updated to "(fine tomorrow) it is very fine day today."

When the changing process in step Sc7 of FIG. 11 considering the above missing field and filed size is completed, the routine advances to step Sc3.

In step Sc3, it is determined whether an unprocessed edit flag information is present or not as in the case of the above deleting process and adding process, and if there is any unprocessed edit flag information, the routine returns to step Sc1. The process of updating PC database 300a on the basis of received contents in step S12 of FIG. 10 is thus performed.

When the process of updating PC database 300a is completed, a next process of detecting items edited by PC 300 following completion of a last previous data updating is performed (step S13).

In detecting edited items, it is possible to select the range of items to be detected in PC 300. In the data updating method of the present embodiment, schedule management application data are treated, and thus data of an item relates to a date and time such as a start time of an event. Therefore, as shown in FIG. 15, it is possible to limit time range of items to be detected in such a way to select items that fall within a range from X days before the present date to Y days after the present date.

Figure 15:
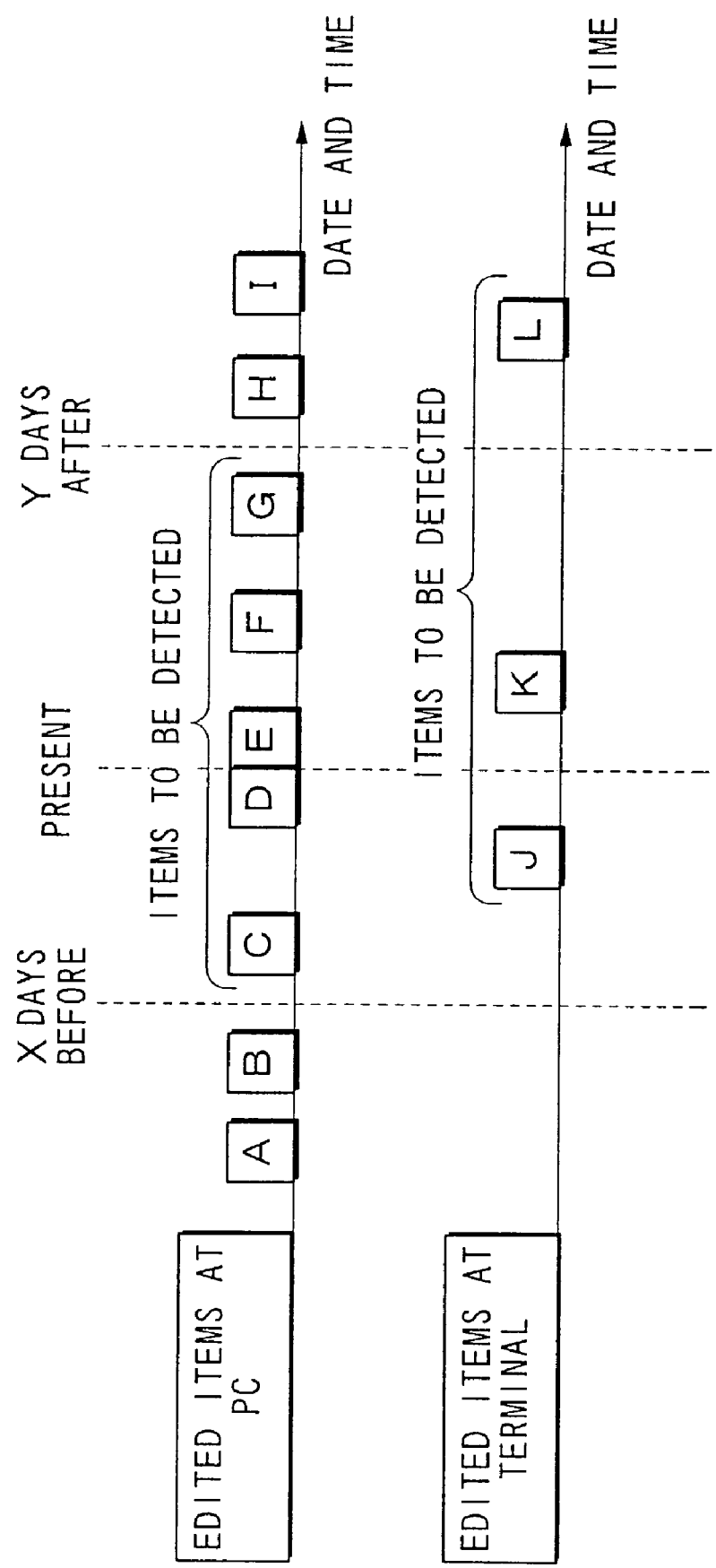
FIG. 15 is a diagram illustrating items to be detected in a process of detecting items edited in the PC, which is a process for implementing the data updating method.

Specifically, when items A to I are stored in PC database 300a as shown in FIG. 15, items C to G which fall within the range of X days before a present date to Y days after the present date are selected, and data of items edited following completion of a last previous data updating are detected among the items C to G. The process of detecting newly added, changed, or deleted items is then performed, which process is the same as what is described above in the section of data updating based on items edited in PC.

In the case of detecting items edited at handheld information terminal 200, items to be detected are not selected as in the case of PC 300, and data in PC database 300a are updated on the basis of all items that are edited at handheld information terminal 200 (refer to step S12 of FIG. 11).

Edited items are detected among selected items only in the case of detecting edited items at PC because the memory capacity of a storage device in handheld information terminal 200 is usually smaller that of PC 300. Limiting, by a time period, items to be updated as in the above case makes it possible to prevent unnecessary data from being accumulated in terminal database 200a.

When the detecting operation of edited items at PC 300 (step S13 of FIG. 10) is completed, data of detected items and ID numbers of items to be deleted are transmitted to handheld information terminal 200 (step S14).

Figure 16:
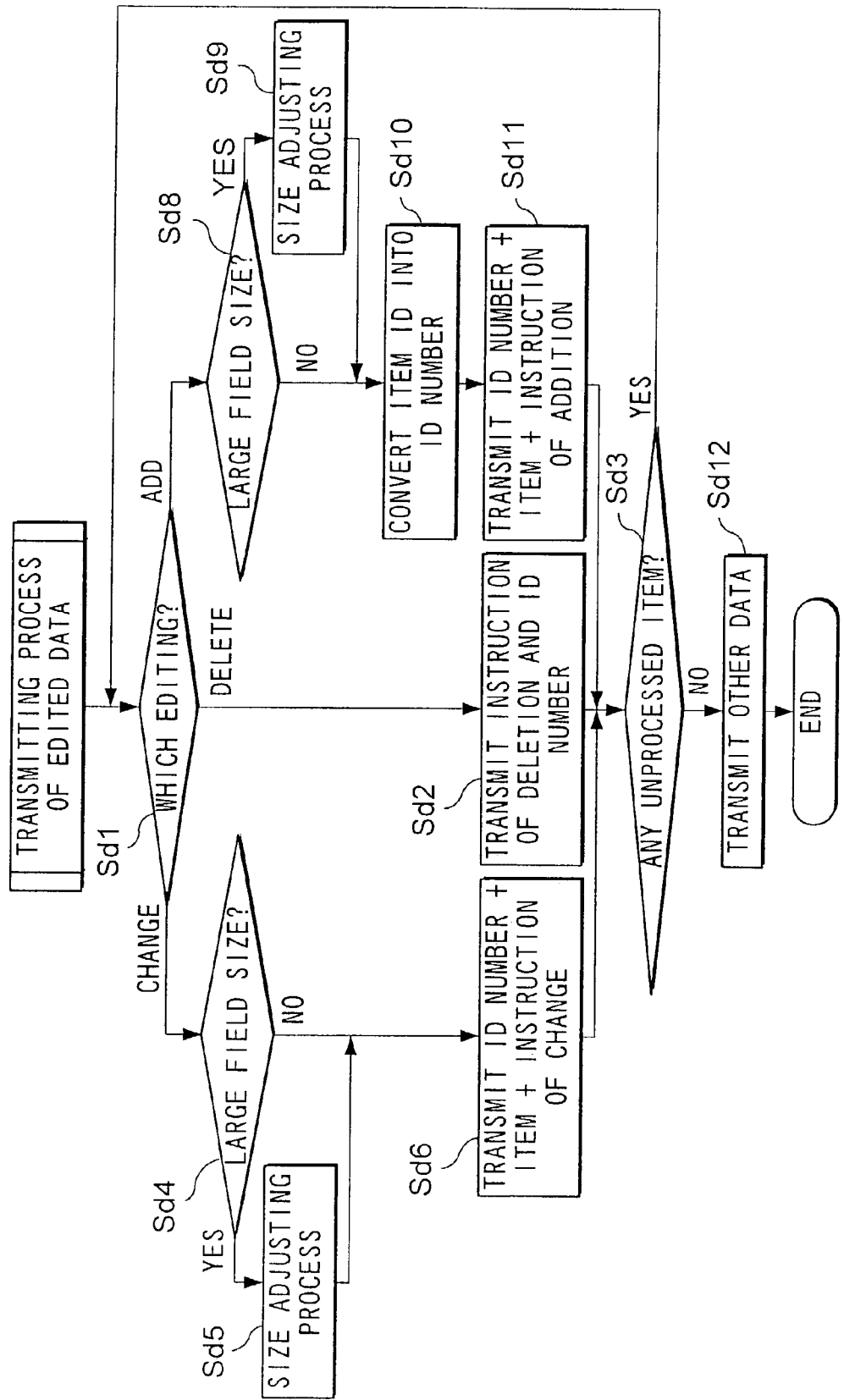
FIG. 16 is a flow chart illustrating a process for implementing the data updating method; and, specifically, a process of transmitting edited data, the process being implemented by the PC.

Reference is now made to FIG. 16 to describe the transmitting process of step S14 in detail. First in this process, it is determined what kind of editing has been made for each of items detected by the above detecting process (Sd1).

When it is determined that deletion has been performed for one of the detected items, PC 300 refers to the synchronization profile SP to obtain an ID number from an item ID of the deleted item. The ID number and the edit instruction information which instructs handheld information terminal 200 to delete the item are transmitted to the terminal 200 (step Sd2). Then, it is determined whether there is any unprocessed item among the edited items detected in the above detecting process (step Sd3).

In the case that there is an item indicated as a changed item in the determination of step Sd1, it is first determined whether the data size of each field constituting the changed item is larger than a predetermined field size of terminal database 200a (step Sd4).

The determination in step Sd4 is performed with consideration to the limited field size in compact terminals. The predetermined size denotes the maximum amount of data that can be included in a field of an item in the database of handheld information terminal 200. Because compact terminals such as handheld information terminal 200 have a storage device with a small memory capacity compared to PCs as described above, the maximum data size of a field is often set smaller than that in PCs. When data of an item having a field that exceeds the maximum field size allowable in terminal database 200a is transmitted from PC 300 to handheld information terminal 200, the transmitted data cannot be stored in terminal database 200a.

In the case that it is found that data is edited at PC 300 of an item with a larger field size than the maximum field size allowable in terminal database 200a (step Sd4; YES), the data size of a field in the changed item is adjusted (step Sd5).

Specifically, an adjustment is made in such a way to leave only the head portion of a character string written in the subject field and to delete other data, only the head portion being transmitted to handheld information terminal 200. The ID number of an item and edit instruction information which instructs the change of the item as well as the adjusted item are transmitted to handheld information terminal 200 (step Sd6). After the transmission of the data is completed, the routine advances to step Sd3 as in the case of deleted items and returns to step Sd1 if there is any unprocessed item.

In the case that it is determined that an item has been newly added in the determination of step Sd1, it is determined whether or not the size of each field of the newly added item is larger than the above predetermined size as in the case of changed items (step Sd8).

Then, when it is found that the newly added item at PC includes a field of a larger size compared to the maximum field size allowed in terminal database 200a (step Sd8; YES), the data size of the larger field is adjusted (step Sd9). The adjustment is made in the same way as the above.

Then, the item ID of the newly added item is converted to an ID number (step Sd10); data of the adjusted item with its ID number, edit instruction information that instructs handheld information terminal 200 to add the item are transmitted to the terminal 200 (step Sd11). When the transmission is completed, the routine advances to step Sd3 as in the case of the deleted or changed items, and if there is any unprocessed item, the routine returns to step Sd1.

In the case that no unprocessed item is found in the determination of step Sd3, and that all data of detected items required for updating are transmitted, ID numbers converted from item IDs at PC are transmitted to handheld information terminal 200 (step Sd12). The ID numbers correspond to items newly added to terminal database 200*a*, and are converted from item IDs during the updating process at PC based on received contents, specifically step Sc6 of FIG. 11.

When the transmission process of step S14 in FIG. 10 is thus completed, handheld information terminal 200 receives the data transmitted from PC 300. Handheld information terminal 200 performs updating of application data stored in terminal database 200*a* on the basis of the received data (step S15). The data updating operation in this step is the same as described in the section of data updating based on the items edited at PC, and handheld information terminal 200 performs data updating according to the received edit instruction information.

PC 300, upon completion of the transmission process of edited data, updates synchronization profile SP on the basis of contents of the memory of its own PC database 300*a* that have been updated on the basis of the edited contents at handheld information terminal 200 (step S16). The data updating process between handheld information terminal 200 and PC 300 is then completed.

B. SECOND EMBODIMENT

A data updating method with respect to a second embodiment of the present invention will now be described.

Figure 17:
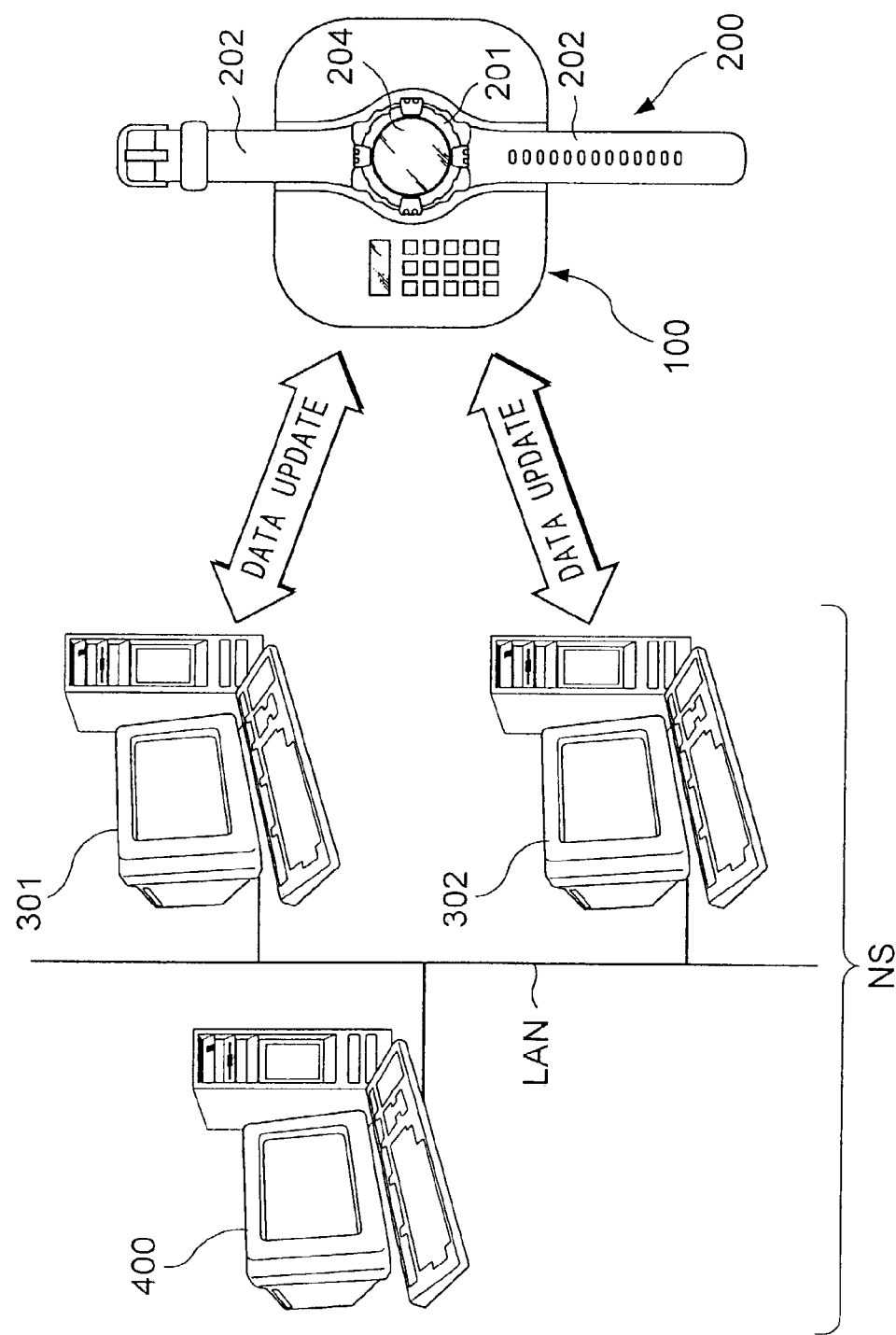
FIG. 17 is a diagram showing a schematic configuration of a system to which the data updating method is applied, with respect to a second embodiment of the present invention.

FIG. 17 shows an example of a schematic configuration of a system to which the data updating method is applied with respect to a second embodiment of the present invention.

As shown in the figure, the example system configuration includes a network system NS with a server 400 that is connected through a Local Area Network (LAN) with a plurality of client PCs 301, 302, . . . , each PC having the same function as the above PC 300. A handheld information terminal 200' is capable of performing a data updating process as described above with each of client PCs 301, 302, . . . of the network system NS.

In network system NS, application data the same as the above first embodiment is shared in a database of server 400. Application data are edited by a schedule management application executed in clients PC 301, 302, . . . , and when application data is edited at one client PC, the edited application data can be shared by the other client PCs.

The principle of the data updating method with respect to the second embodiment is completely the same as that in the first embodiment, and the above mentioned ID numbers, edit flag information, and other information are also used in performing a data updating operation between handheld information terminal 200' and each client PC.

Further, while synchronization profile SP is stored only in PC 300 in the above first embodiment, it is stored also in handheld information terminal 200' in the second embodiment.

Storing synchronization profile SP in handheld information terminal 200' allows a user of the terminal to perform data updating as described in the first embodiment with any one of client PCs connected to network system NS. Also, user information stored in synchronization profile SP in each of client PC 301, 302, . . . and handheld information terminal 200' can be used for authorization; data updating is permitted only when user information stored in each of the two devices is determined to be identical to each other.

The second embodiment of the present invention will be described hereinafter, illustrating a case where client PC 301 first gives its application data to handheld information terminal 200' that is in an initial state, and after editing is performed at each of databases of handheld information terminal 200' and network system NS, data updating is performed between handheld information terminal 200' and client PC 302.

First, data stored in a network database NSa is shared to a database of handheld information terminal 200' (hereinafter referred to as database 200*b*) through data communication between the terminal and client PC 301; database 200*b* being in an initial state. Consequently, application data stored in network database NSa is duplicated to database 200*b*. The updating process performed here is the same as described in the above first embodiment.

Next, when the data updating operation is completed to make both databases and synchronization profile SP up-to-date, the updated synchronization profile SP is transmitted from client PC 301 to handheld information terminal 200'. Handheld information terminal 200' stores the transmitted synchronization profile SP in its own memory.

Figure 18:
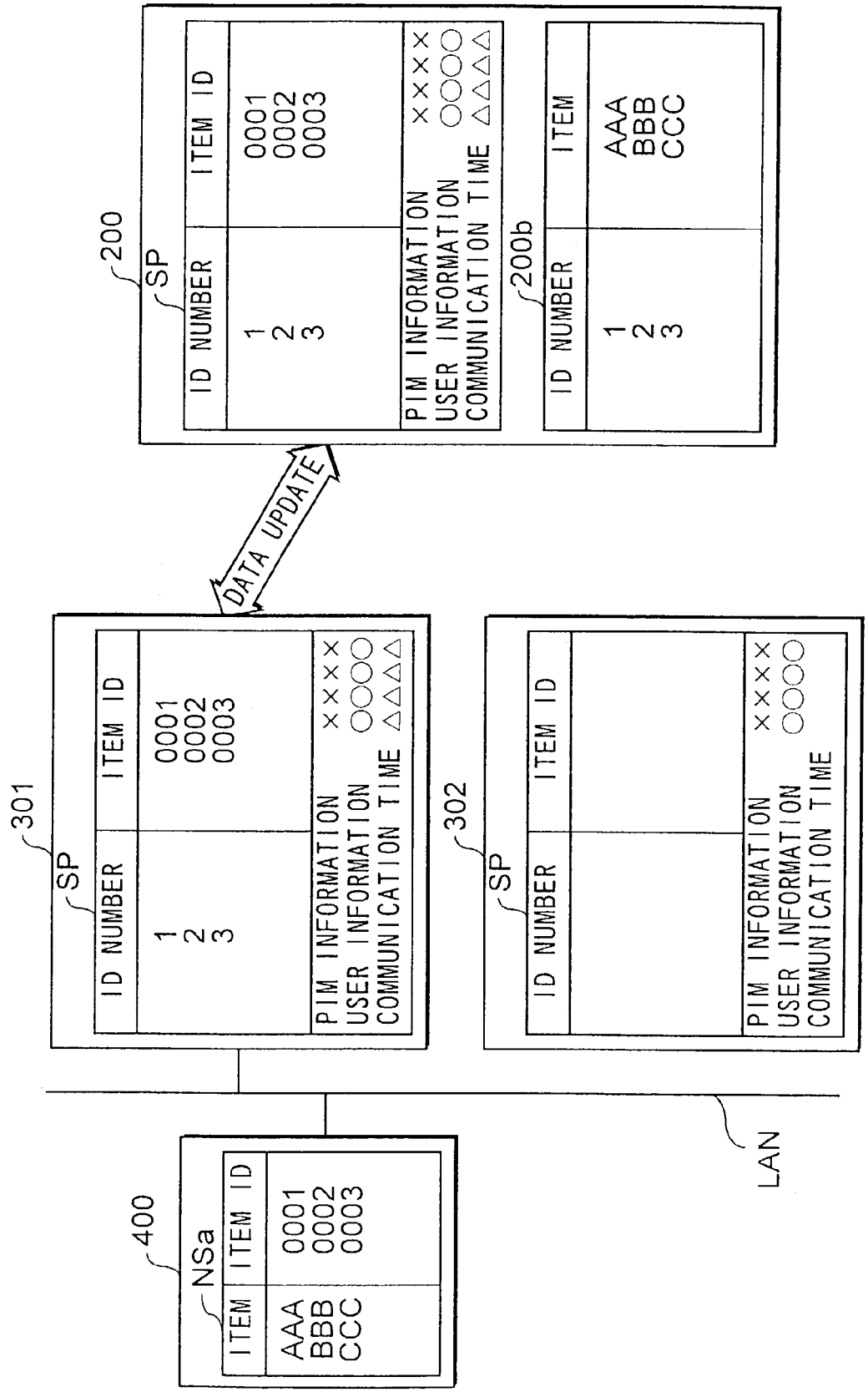
FIG. 18 is a diagram illustrating the principles underlying the data updating method of the second embodiment.

FIG. 18 is an example of data stored in each device on completion of the data updating operation. Data stored in synchronization profile SP of client PC 301 include item IDs of items stored in each of the databases of server 400 and handheld information terminal 200'; and ID numbers corresponding thereto, the synchronization profile SP also including PIM information, user information, and communication time information.

Data stored in database NSa is the same as those stored in PC 300*a* (refer to FIG. 2) of the first embodiment. The database NSa stores not only items and item IDs but also edit time information, but only the items and item IDs are shown in FIG. 18 for simplicity. The database 200*b* of handheld information terminal 200' also stores the same data as terminal database 200*a* (refer to FIG. 2) of the above first embodiment; only items and ID numbers are shown in the figure for simplicity.

Figure 19:
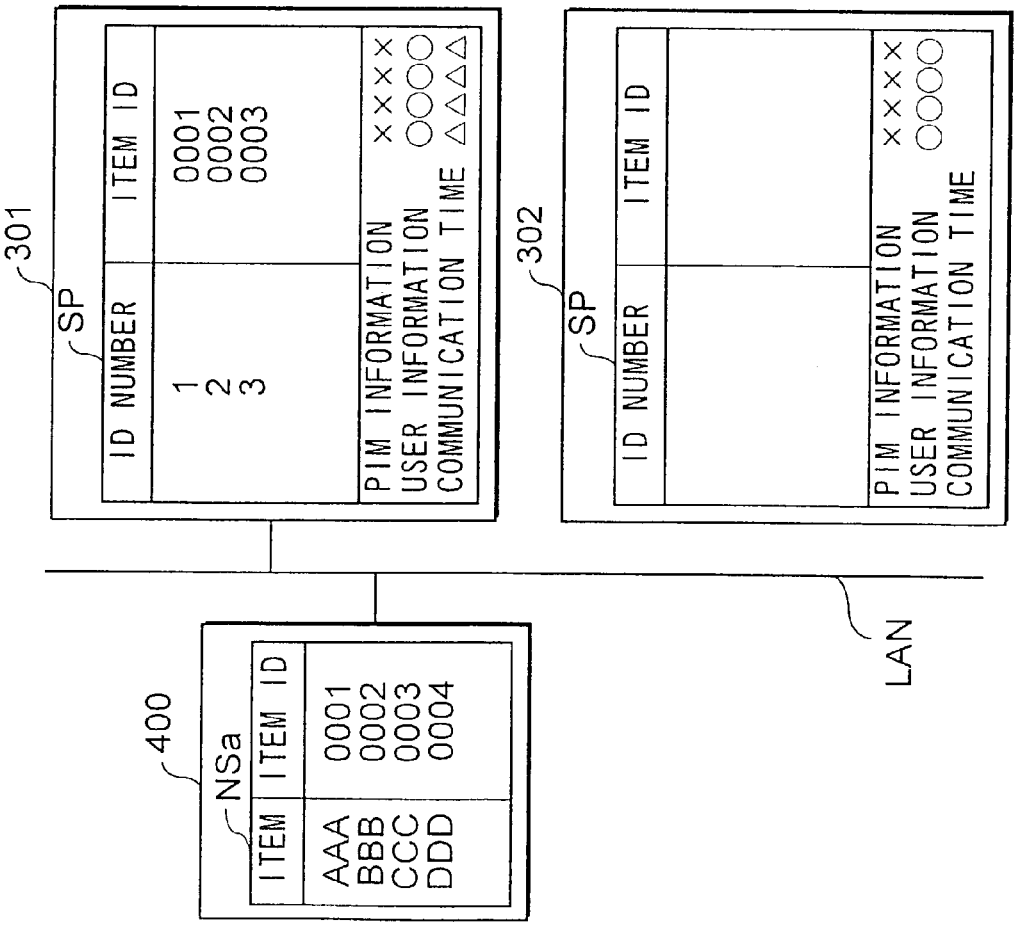
FIG. 19 is a diagram illustrating the principles underlying the data updating method of the second embodiment.

Subsequently, application data stored in each of database 200*b* and database NSa is edited at each of handheld information terminal 200' and network system NS. We assume that application data in each of database 200*b* and database NSa are changed to such as is shown in FIG. 19 as a result.

The figure shows that item "EEE" has been newly added at handheld information terminal 200' and that item "DDD" has been newly added at network system NS.

Figure 20:
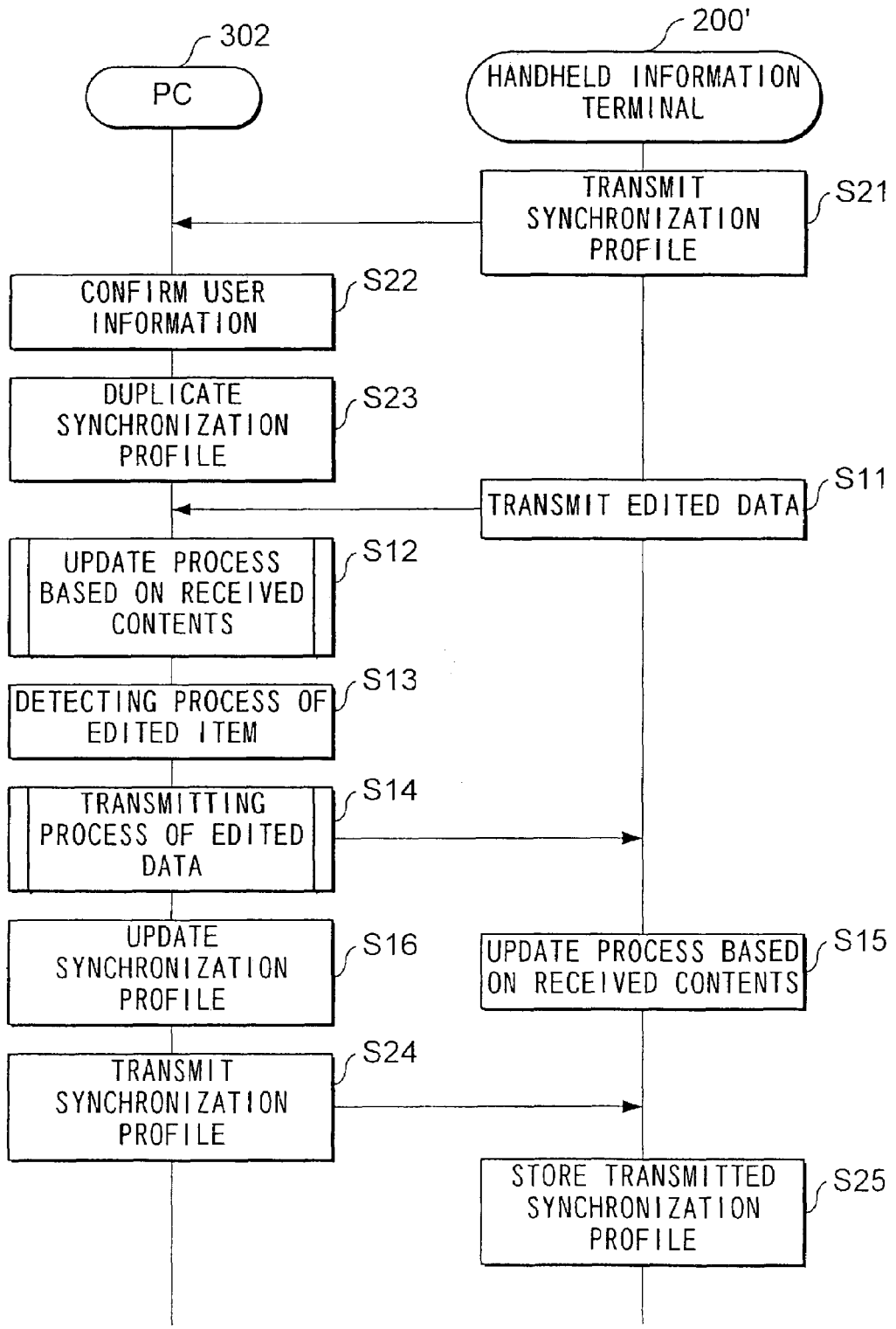
FIG. 20 is a flow chart showing a processing operation sequence enacted in a client PC and a handheld information terminal in implementing the data updating method of the second embodiment; the client PC and the handheld information terminal being components of the system.

FIG. 20 is a flow chart illustrating a processing operation sequence enacted in client PC 302 and handheld information terminal 200' for implementing the data updating method of the second embodiment.

In performing data updating process, handheld information terminal 200' and client PC 302 are connected to each other, and handheld information terminal 200' first transmits its own synchronization profile SP to client PC 302 (step S21).

Client PC 302, upon receiving the synchronization profile SP transmitted from handheld information terminal 200', determines whether user information stored therein is the same as user information stored in the synchronization profile SP in its own PC database (step S22).

In this example, it is supposed that this is the first data updating performed between handheld information terminal 200' and client PC 302; therefore, only PIM information and user information are being written in the synchronization profile SP contained in client PC 302. In other words, item IDs, ID numbers, and communication time are left blank in synchronization profile SP stored in client PC 302 as shown in FIG. 19.

On the other hand, PIM information and user information are stored in the synchronization profile SP of client PC 302, and they are identical to those in the synchronization profile SP of client PC 301. Also, as described above, synchronization profile SP stored in handheld information terminal 200' is the one transmitted from client PC 301 in a last previous data updating operation where application data in the network database NSa was duplicated to database 200b which had been in an initial state. Consequently, user information stored in the synchronization profile SP of handheld information terminal 200' must be the same as user information stored in the synchronization profile SP of client PC 302.

If user information stored in synchronization profiles of each of handheld information terminal 200' and client PC 302 do not agree with each other, handheld information terminal 200' could be owned by a third user or falsely remodeled. To prevent data updating to be performed with an unauthorized terminal, client PC 302 performs the above determination and allows data updating only when user information stored in the synchronization profile SP of handheld information terminal 200' is the same as the user information in its own synchronization profile SP.

When user information in each synchronization profile is determined to be the same, a data updating process is initiated. The synchronization profile SP of client PC 302 first duplicates item IDs, ID numbers, and communication time information described in the synchronization profile SP transmitted from handheld information terminal 200' (step S23).

Then, as in the first embodiment, edited data are transmitted from handheld information terminal 200' to client PC 302 (refer to step S11 of FIG. 10), and client PC 302 performs a data updating process in the same way as the first embodiment (refer to steps S12 to S16 of FIG. 10) by referring to the duplicated synchronization profile SP.

After the data updating process is performed, the synchronization profile SP updated in client PC 302 is transmitted to handheld information terminal 200' (step S24), and handheld information terminal 200' stores the updated synchronization profile SP (step S25).

Figure 21:
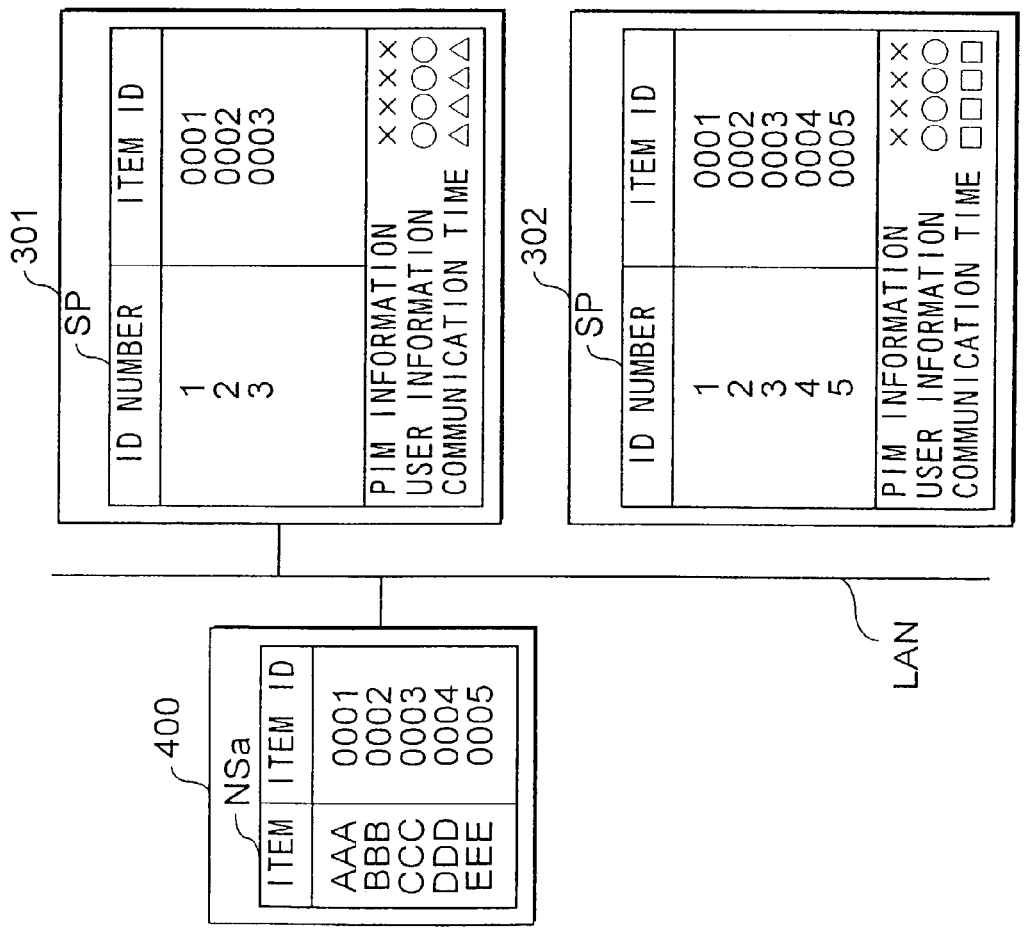
FIG. 21 is a diagram illustrating the principles underlying the data updating method of the second embodiment.

Consequently, the databases of network system NS and handheld information terminal 200' on completion of the data updating operation will be such as are shown in FIG. 21. As shown in the figure, changes made at each of handheld information terminal 200' and network system NS are reflected to data stored in each of network database NSa and database 200b.

However, a next data updating operation cannot be performed between handheld information terminal 200' and client PC 301, using the synchronization profile stored in client PC 301 because the synchronization profile of client PC 301 stores out-of-date data of the previous synchronization operation.

Therefore, it becomes necessary, in performing data updating between handheld information terminal 200' and client PC 301 following the data updating operation between handheld information terminal 200' and client PC 302, to transmit the updated synchronization profile SP from handheld information terminal 200' to client PC 301 to replace the memory of the synchronization profile SP contained therein, the synchronization profile SP stored in handheld information terminal 200' being the most updated one.

In a conventional data updating method, a synchronization profile (storing actual data of items instead of ID numbers) is not stored in handheld devices but only in PCs. Therefore, data updating between client PC 302 and handheld information terminal 200' as described above cannot be performed using the conventional method when neither of client PC 302 or handheld information terminal 200' contains a synchronization profile storing most recent data updated at a last previous synchronization, and items edited following completion of a last previous update cannot be detected.

To the contrary, in the data updating method of the second embodiment, a synchronization profile is stored in a memory of handheld information terminal 200', thereby enabling data updating between handheld information terminal 200' and any one of client PCs 301, 302, . . . .

However, storing a synchronization profile in handheld information terminal 200' requires the downsizing of data size of the file because handheld information terminal 200' has a limited memory capacity compared to PCs.

Therefore, the synchronization profile SP used in the second embodiment stores only data for identifying items such as item IDs and ID numbers instead of actual contents of items as stored in the conventional synchronization profile. In other words, in the second embodiment, the data-size of a synchronization profile is much reduced compared to those used in the conventional data updating, enabling handheld information terminal 200' to store a synchronization profile without pressuring its memory.

Thus, the second embodiment enables the data updating between handheld information terminal 200' and each client PC of network system NS as stated above, without overloading the memory of handheld information terminal 200'.

C. MODIFICATIONS

The above first and second embodiments should not be construed as limitations on the scope of the invention, and it is apparent to those skilled in the art that modifications may be made within the scope of the spirit of the invention. For example, various modifications are possible as follow:

First Modification

While, in the above first embodiment, synchronization profile SP is contained in PC 300, it is possible for handheld information terminal 200 to contain synchronization profile SP. Also, synchronization profile SP may be contained in an external storage device connected with PC 300 for use.

Second Modification

When the data size of an item ID used in an application such as PIMs is originally small, for example, about 5 to 10 bytes, it is possible to omit the process of converting item IDs to ID numbers and to use only item IDs.

In this case, the synchronization SP does not store ID numbers but only item IDs and other information such as PIM information, and item IDs, instead of ID numbers, are stored in terminal database 200a of handheld information terminal 200 to identify an item by an item ID.

In the modification, there would be no increase in the data amount stored in a synchronization profile nor in terminal database 200a because actual data of items are not stored therein.

Third Modification

While the updating processing is performed for each item in the above embodiments, a data unit to be processed does not have to be an item but may be a field. That is, ID numbers may be assigned to each field, and a detecting process of edited data may be performed for each field.

Fourth Modification

In the third modification, PC 300 or client PCs such as 301 & 302 handle application data created by a plurality of different applications.

In this case, a data configuration handled in each of the plurality of applications is sometimes different from one another; the number of fields included in an item and the maximum data size of a field sometimes varies as explained above. Therefore, it is necessary for the above synchronization processing program to consider possible difference in data configuration.

Figure 22:
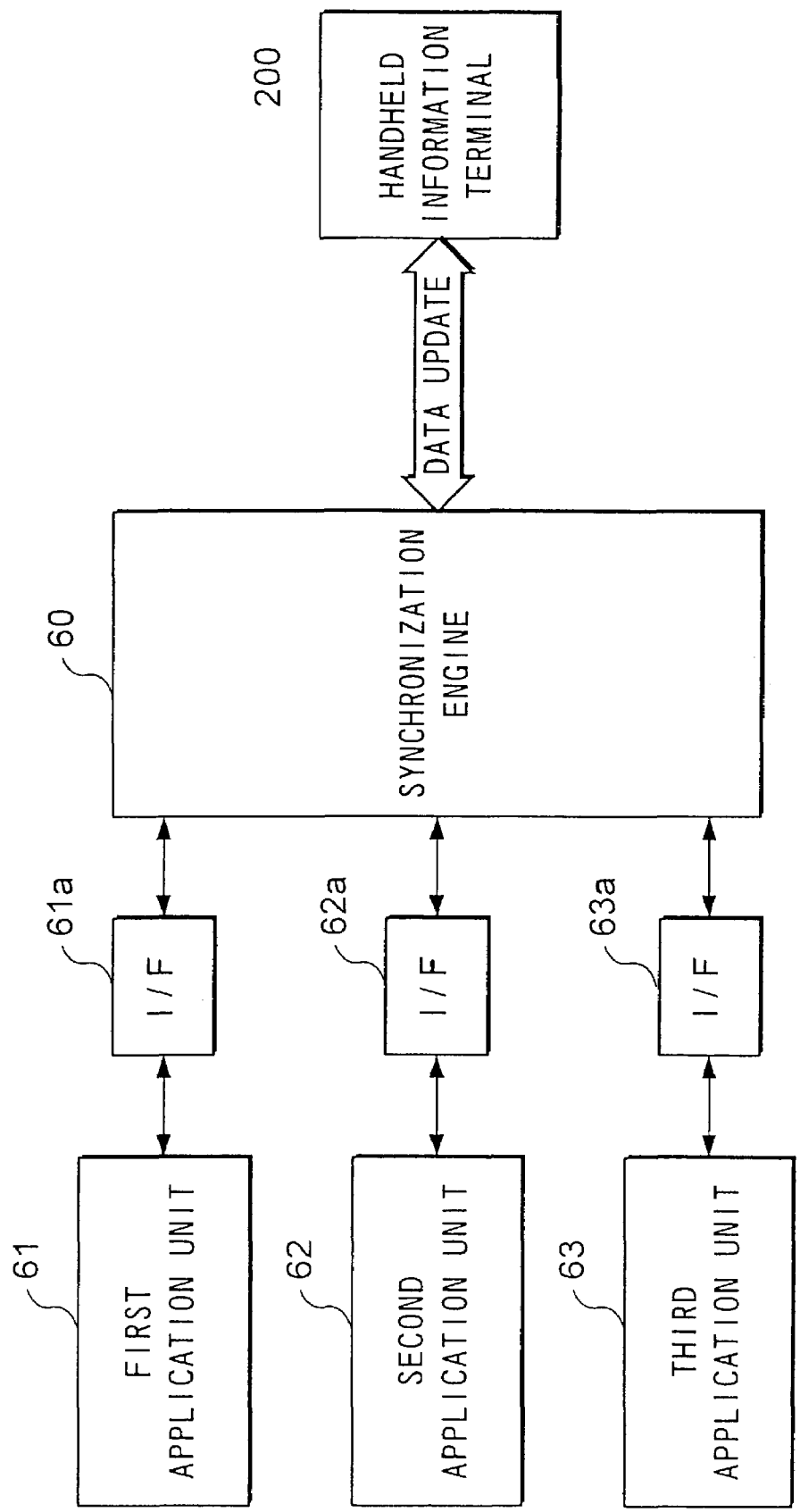
FIG. 22 is a diagram showing an example of a functional configuration for implementing he data updating method with respect to the embodiments.

Alternatively, it is possible to configure PC 300 or client PCs such as 301 & 302 in such a way as shown in FIG. 22 to implement a data updating process described in the above embodiments of application data when they are created by a plurality of different applications.

As shown in FIG. 22, a PC contains a synchronization engine unit 60, a component of a functional configuration, which is implemented by the above synchronization processing program, the PC also containing a first application unit 61, a second application unit 62, and a third application unit 63, each of which is also a component of a functional configuration and implemented by a plurality of (three in the example shown in the figure) different application programs such as PIMs; and interface units 61*a*, 62*a*, and 63*a* that lie between each of the application units and synchronization engine unit 60.

Each interface unit 61*a*, 62*b*, and 63*b* corresponds to each of first application unit 61, second application unit 62, and third application unit 63, and each of the interface units converts application data in different formats created by its corresponding application unit into one format that can be handled by synchronization engine 60. As a consequence, synchronization engine 60 does not have to recognize data configuration which differs depending on an application, to thereby allow a simple program configuration.

Fifth Modification

While data updating with the present invention is performed between a PC 300 or client PCs such as 301 & 302 and a handheld information terminal 200 or 200' in the above embodiments, the data updating may be performed between two handheld information terminals.

Sixth Modification

While wristwatch-type handheld information terminals 200, 200' are used in the above embodiments, it is not restricted to the wristwatch-type. For example, it is possible to use information processing devices such as notebook-sized personal computers and PDAs with typical appearance.

Seventh Modification

Embodiments of the present invention include not only an embodiment such as of producing and selling a device which performs data updating as disclosed in the above-mentioned embodiments but also an embodiment of distributing through a telecommunication line a program for making a network-connected computer function as a data updating device as disclosed in the above embodiments; and an embodiment of distributing such a program recorded in a computer-readable recording medium.

What is claimed is:

1. A method for synchronizing a first database, which is shared by a plurality of first devices through a network, with a second database stored in a second device, which is a handheld device, comprising:
  (a) performing an initialization operation having
    (a1) when a synchronization between the first and second databases is completed by one of the plurality of first devices that accesses the first database and by the second device that accesses the second database, transmitting an update file from the one of the plurality of first devices to the second device, the update file containing (i) communication time data indicating a current time, and (ii) one or more identifiers each of which identifies each data unit currently contained in the first database,
    (a2) storing in the second device the update file transmitted from the one of the plurality of first devices in step (a1), and
    (a3) when the synchronization between the first and second databases is completed by the one of the plurality of first devices and the second device, resetting one or more flags each stored in association with each data unit in the second database, a flag indicating whether a corresponding data unit is newly added, changed or deleted;
  (b) a database update operation having
    (b1) when a request is provided to any one of the plurality of first devices, adding a new data unit to the first database, changing a data unit in the first database, or deleting a data unit from the first database, in accordance with the request,
    (b2) when a data unit in the first database is changed, storing edit time data indicating a current time in the first database in association with the changed data unit,
    (b3) when a request is provided to the second device, adding a new data unit to the second database, changing a data unit in the second database, or deleting a data unit from the second database, in accordance with the request, and
    (b4) when a data unit in the second database is newly added, changed, or deleted, storing in the second database a status indicator indicating the data unit is newly added, changed, or deleted respectively, in association with the data unit; and
  (c) performing a synchronization operation having
    (c1) transmitting the update file from the second device to another of the plurality of first devices,
    (c2) determining which data unit in the first database is newly added, changed, or deleted, after the most recent synchronization was completed, on the basis of data contained in the update file received from the second device in step (c1), the one or more identifiers each of which identifies each data unit currently contained in the first database, and the edit time data stored in the first database,
    (c3) determining which data unit in the second database is newly added, changed, or deleted, after the most recent synchronization was completed, on the basis of the one or more flags stored in the second database, (c4) updating the second database on the basis of a result of the determination with regard to the first database, and (c5) updating the first database on the basis of a result of the determination with regard to the second database, and when step (c) completes, step (a) is performed with regard to the another of the plurality of first devices and the second device.

2. A method according to claim 1, wherein
step (c2) comprises:
determining a data unit currently stored in the first database, which is not identified by any one of the one or more identifiers contained in the update file, as a newly added data unit;

determining a data unit currently stored in the first database, an identifier of which is contained in the update file in association with edit time data indicating a later time than a time indicated by the communication time data contained in the update file, as a changed data unit; and determining a data unit, an identifier of which is contained in the update file and which is not currently stored in the first database, as a deleted data unit.

3. A method according to claim 1, wherein
the updating steps (c4) or (c5) with regard to one of the first and second databases comprises:
with regard to a data unit determined as a newly added data unit in the determining step with regard to the one of the first and second databases, transmitting the newly added data unit along with an identifier of the newly added data unit from the device accessing the one of the first and second databases to the other of the first and second devices;

with regard to a data unit determined as a changed data unit in the determining step with regard to the one of the first and second databases, transmitting the changed data unit along with an identifier of the changed data unit from the device accessing the one of the first and second databases to the other of the first and second devices;

with regard to a data unit determined as a deleted data unit in the determining step with regard to the one of the first and second databases, transmitting an identifier of the deleted data unit from the device accessing the one of the first and second databases to the other of the first and second devices;

when one of the first and second devices receives a data unit along with an identifier which does not identify any data unit contained in the database stored in the one of the first and second devices, adding the received data unit to the database accessed by the one of the first and second devices;

when the one of the first and second devices receives a data unit along with an identifier which identifies a data unit contained in the database accessed by the one of the first and second devices, overwriting the received data unit onto the identified data unit in the database accessed by the one of the first and second devices; and when the one of the first and second devices receives an identifier without a corresponding data unit, deleting from the database accessed by the one of the first and second devices a data unit identified by the received identifier.

4. A method according to claim 1, wherein
each of the plurality of first device and the second device stores user information,
further comprises determining whether the user information stored in the another of the plurality of first devices and the user information stored in the second device are the same, and step (c) is performed only in the case that the user information stored in the another of the plurality of first devices and the user information stored in the second devices are the same.

5. A device comprising:
a memory for storing an update file containing (i) communication time data indicating a time when a most recent synchronization operation between a first database, which is stored in a server, and a second database, which is stored in an external device, was completed and (ii) one or more identifiers each of which identifies each data unit contained in the first database at the time when the most recent synchronization operation was completed;

a communicating unit for communicating with the server and the external device; and a controller
for, when a request is provided, adding a new data unit to the first database, changing a data unit in the first database, or deleting a data unit from the first database, in accordance with the request, by accessing the server through the communication unit;

for, when a data unit in the first database is changed, storing edit time data indicating a current time in the first database in association with the changed data unit, by accessing the server through the communication unit;

for performing a synchronization operation having
receiving the update file from the external device through the communication unit and storing the received update file in the memory, determining which data unit in the first database is newly added, changed, or deleted, after the most recent synchronization was completed, on the basis of data contained in the received update file stored in the memory, the one or more identifiers each of which identifies each data unit currently contained in the first database, which are received from the server through the communication unit, and the edit time data stored in the first database, which is received from the server through the communication unit, with regard to a data unit determined as a newly added data unit, transmitting the newly added data unit along with an identifier of the newly added data unit through the communication unit to the external device, with regard to a data unit determined as a changed data unit, transmitting the changed data unit along with an identifier of the changed data unit through the communication unit to the external device, and with regard to a data unit determined as a deleted data unit, transmitting an identifier of the deleted data unit through the communication unit to the external device;

for, when the synchronization operation completes, updating the update file stored in the memory; and for, when the update file is updated, transmitting the updated update file stored in the memory through the communication unit to the external device.

* * * * *